United States Patent
Kim

(10) Patent No.: US 10,971,154 B2
(45) Date of Patent: Apr. 6, 2021

(54) APPLICATION PROCESSOR INCLUDING LOW POWER VOICE TRIGGER SYSTEM WITH DIRECT PATH FOR BARGE-IN, ELECTRONIC DEVICE INCLUDING THE SAME AND METHOD OF OPERATING THE SAME

(71) Applicant: Samsung Electronics Co., Ltd., Suwon-si (KR)

(72) Inventor: Sun-Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 16/185,776

(22) Filed: Nov. 9, 2018

(65) Prior Publication Data

US 2019/0228772 A1 Jul. 25, 2019

(30) Foreign Application Priority Data

Jan. 25, 2018 (KR) .................. 10-2018-0009496

(51) Int. Cl.
*G10L 15/22* (2006.01)
*G06F 3/16* (2006.01)
*G10L 15/28* (2013.01)
*G10L 15/08* (2006.01)
(Continued)

(52) U.S. Cl.
CPC ............ *G10L 15/222* (2013.01); *G06F 3/162* (2013.01); *G10L 15/08* (2013.01); *G10L 15/28* (2013.01); *G10L 21/0232* (2013.01); *G10L 2015/088* (2013.01); *G10L 2015/223* (2013.01); *G10L 2021/02082* (2013.01)

(58) Field of Classification Search
CPC ....... G10L 15/22; G10L 15/222; G10L 15/28; G10L 15/30; G10L 21/0208; G10L 2021/02082; G10L 15/08; G10L 21/0232; G06F 3/162; G06F 3/167
See application file for complete search history.

(56) References Cited

U.S. PATENT DOCUMENTS 4,266,254 A * 5/1981 Hobrecht ................ H03F 3/183
360/61
4,501,012 A * 2/1985 Kishi ................... B60R 16/0373
704/275
(Continued)

*Primary Examiner* — Eric Yen
(74) *Attorney, Agent, or Firm* — Sughrue Mion, PLLC

(57) ABSTRACT

An application processor may include a host processor, a voice trigger system and an audio subsystem electrically connected to a system bus. The voice trigger system may be configured to perform a voice trigger operation and to issue a trigger event. The audio subsystem may be configured to replay an audio output stream through an audio interface. A direct bus may be configured to provide a communication path between the voice trigger system and the audio subsystem during a barge-in condition in which the voice trigger operation and the replay of the audio output stream are performed together. The application processor may be configured to generate compensated trigger data by performing an echo cancellation with respect to microphone data received from a microphone, and the voice trigger system may be configured to perform the voice trigger operation during the barge-in condition based on the compensated trigger data.

20 Claims, 21 Drawing Sheets

(51) Int. Cl.
*G10L 21/0232* (2013.01)
*G10L 21/0208* (2013.01)

(56) References Cited

U.S. PATENT DOCUMENTS

| | | | | |
|---|---|---|---|---|
| 4,736,317 | A * | 4/1988 | Hu | G06F 15/7832 |
| | | | | 711/214 |
| 4,870,704 | A * | 9/1989 | Matelan | G06F 13/36 |
| | | | | 710/120 |
| 5,159,638 | A * | 10/1992 | Naito | G10L 25/78 |
| | | | | 704/213 |
| 5,657,422 | A * | 8/1997 | Janiszewski | G10L 19/012 |
| | | | | 704/229 |
| 5,708,704 | A * | 1/1998 | Fisher | H04B 3/23 |
| | | | | 379/406.03 |
| 6,098,043 | A * | 8/2000 | Forest | G10L 15/26 |
| | | | | 379/88.01 |
| 6,101,472 | A * | 8/2000 | Giangarra | G10L 15/22 |
| | | | | 704/275 |
| 6,151,397 | A * | 11/2000 | Jackson, Jr. II | G10L 21/0208 |
| | | | | 381/71.1 |
| 6,282,268 | B1 * | 8/2001 | Hughes | H04M 3/493 |
| | | | | 379/88.02 |
| 6,353,867 | B1 * | 3/2002 | Qureshi | G06F 13/4027 |
| | | | | 710/305 |
| 6,411,929 | B1 * | 6/2002 | Ishiwatari | G10L 15/08 |
| | | | | 704/239 |
| 6,574,597 | B1 * | 6/2003 | Mohri | G10L 15/183 |
| | | | | 704/251 |
| 6,678,661 | B1 * | 1/2004 | Smith | G10L 21/02 |
| | | | | 704/276 |
| 6,725,193 | B1 * | 4/2004 | Makovicka | G10L 21/02 |
| | | | | 704/233 |
| 8,170,875 | B2 | 5/2012 | Hetherington et al. | |
| 9,251,806 | B2 | 2/2016 | Shah et al. | |
| 9,691,378 | B1 * | 6/2017 | Meyers | G10L 15/04 |
| 9,697,822 | B1 * | 7/2017 | Naik | G10L 15/22 |
| 9,761,116 | B2 | 9/2017 | Dadu et al. | |
| 9,779,726 | B2 | 10/2017 | Hatfield et al. | |
| 9,779,732 | B2 | 10/2017 | Lee et al. | |
| 10,121,494 | B1 * | 11/2018 | Sundaram | G10L 25/30 |
| 2003/0131099 | A1 * | 7/2003 | Springmeyer | H05B 47/155 |
| | | | | 709/224 |
| 2004/0112467 | A1 * | 6/2004 | Mino | B22F 3/02 |
| | | | | 148/108 |
| 2004/0117191 | A1 * | 6/2004 | Seshadri | G10L 15/25 |
| | | | | 704/275 |
| 2004/0243405 | A1 * | 12/2004 | Casparian | G10L 21/0208 |
| | | | | 704/226 |
| 2005/0114118 | A1 * | 5/2005 | Peck | G10L 25/87 |
| | | | | 704/208 |
| 2005/0136848 | A1 * | 6/2005 | Murray | H04M 1/605 |
| | | | | 455/79 |
| 2006/0203105 | A1 * | 9/2006 | Srinivasan | G10L 15/20 |
| | | | | 348/231.4 |
| 2007/0033024 | A1 * | 2/2007 | Budnikov | G10L 19/0204 |
| | | | | 704/230 |
| 2008/0140412 | A1 * | 6/2008 | Millman | G09B 19/06 |
| | | | | 704/270 |
| 2010/0121997 | A1 * | 5/2010 | Lin | G06K 7/0008 |
| | | | | 710/71 |
| 2011/0235812 | A1 * | 9/2011 | Yonekubo | H04R 3/00 |
| | | | | 381/56 |
| 2011/0238417 | A1 * | 9/2011 | Yamamoto | G10L 25/78 |
| | | | | 704/233 |
| 2012/0316869 | A1 * | 12/2012 | Xiang | H04K 3/825 |
| | | | | 704/226 |
| 2013/0063550 | A1 * | 3/2013 | Ritchey | G06F 1/1626 |
| | | | | 348/36 |
| 2013/0142340 | A1 * | 6/2013 | Sehlstrom | H04H 40/81 |
| | | | | 381/17 |
| 2014/0222436 | A1 * | 8/2014 | Binder | G10L 21/16 |
| | | | | 704/275 |
| 2015/0039317 | A1 * | 2/2015 | Klein | G10L 15/22 |
| | | | | 704/275 |
| 2015/0065199 | A1 * | 3/2015 | Shah | G10L 21/0208 |
| | | | | 455/563 |
| 2015/0112690 | A1 | 4/2015 | Guha et al. | |
| 2015/0187369 | A1 * | 7/2015 | Dadu | G10L 15/28 |
| | | | | 704/275 |
| 2015/0206534 | A1 * | 7/2015 | Shinkai | G10L 15/22 |
| | | | | 704/270.1 |
| 2015/0221307 | A1 * | 8/2015 | Shah | G06F 3/165 |
| | | | | 704/253 |
| 2016/0210051 | A1 | 7/2016 | Qutub et al. | |
| 2016/0240193 | A1 * | 8/2016 | Gulati | G10L 15/08 |
| 2016/0358602 | A1 * | 12/2016 | Krishnaswamy | G10L 15/20 |
| 2017/0031420 | A1 * | 2/2017 | Wong | G06F 3/167 |
| 2017/0132904 | A1 * | 5/2017 | Dadu | G08B 21/24 |
| 2017/0162205 | A1 | 6/2017 | Melvin et al. | |
| 2017/0178681 | A1 * | 6/2017 | Keal | G10H 1/0008 |
| 2019/0080690 | A1 * | 3/2019 | Kikugawa | G10L 25/51 |
| 2019/0206412 | A1 * | 7/2019 | Li | G10L 17/00 |
| 2020/0043460 | A1 * | 2/2020 | Sereshki | H04B 17/336 |

* cited by examiner

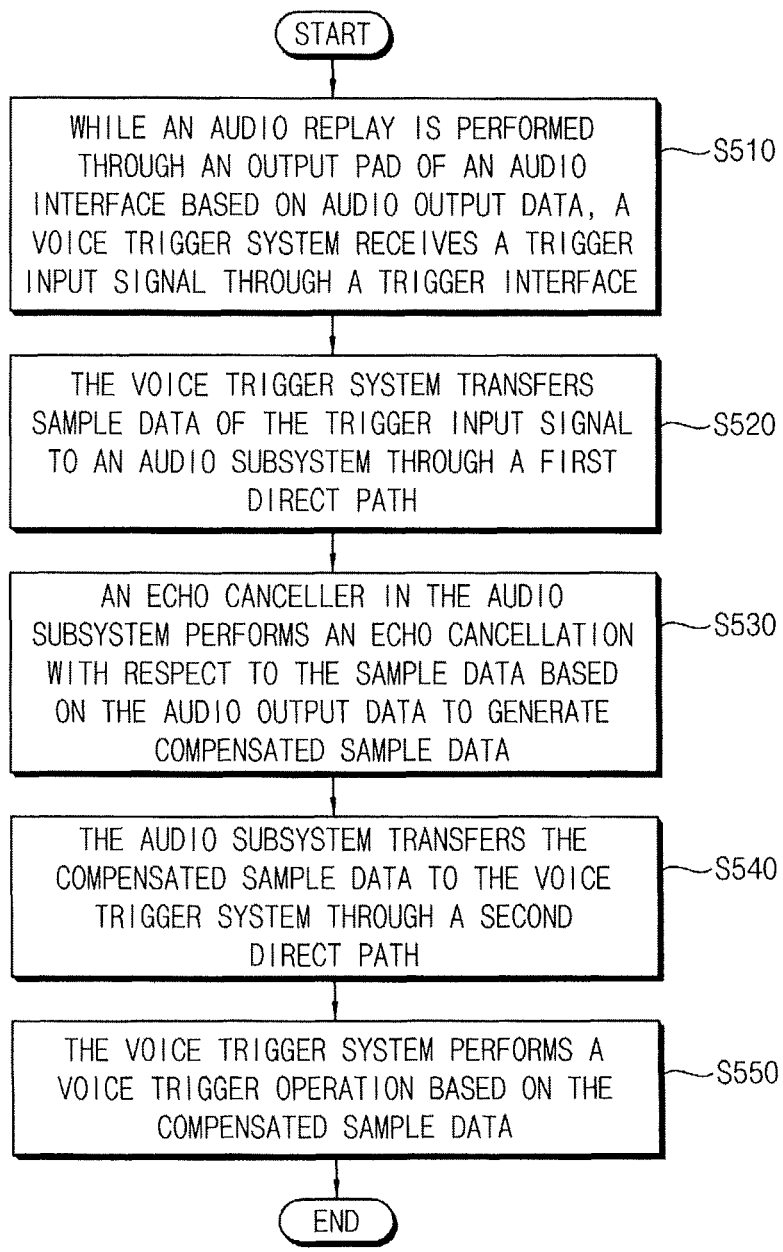

APPLICATION PROCESSOR INCLUDING LOW POWER VOICE TRIGGER SYSTEM WITH DIRECT PATH FOR BARGE-IN, ELECTRONIC DEVICE INCLUDING THE SAME AND METHOD OF OPERATING THE SAME

CROSS-REFERENCE TO RELATED APPLICATION

This application claims priority under 35 USC § 119 to Korean Patent Application No. 10-2018-0009496, filed on Jan. 25, 2018 in the Korean Intellectual Property Office (KIPO), the contents of which are herein incorporated by reference in their entirety.

BACKGROUND

Example embodiments relate generally to semiconductor integrated circuits, and more particularly to application processors including low power voice trigger systems with direct paths for barge-in, electronic devices including the application processors, and methods of operating the application processors.

Some electronic devices may include voice-based or sound-based intelligent interfaces. One advantage of such voice-based or sound-based intelligent interfaces is that users can interact with a device in a hands-free manner without handling or even looking at the device. Hands-free operation can be particularly beneficial when a person cannot or should not physically handle a device, such as when they are driving. However, to initiate some voice-based or sound-based intelligent interfaces, users may be required to press a button or select an icon on a touch screen. This tactile input detracts from the user experience of the voice-based or sound-based intelligent interface.

Accordingly, some electronic devices have been developed to activate a voice-based or sound-based intelligent interface using inputs of voice, speech, sound, sensing, etc., without requiring a tactile input. Such electronic devices may require continuous or intermittent monitoring of an audio channel to detect a voice input and may issue a trigger event for initiating the voice-based intelligent interface. The operation for issuing the trigger event may be referred to as a voice trigger operation. This monitoring of the audio channel may consume electrical power, which may be a limited resource on handheld or portable devices that rely on batteries.

SUMMARY

In some embodiments, an application processor may include a voice trigger system capable of performing a voice trigger operation with low power and supporting a direct path for a barge-in condition.

In some embodiments, an electronic device may include the application processor.

Some embodiments may include a method of operating the application processor.

According to some embodiments, application processors may be provided. An application processor may include a system bus, a direct bus, a host processor, a voice trigger system, and an audio subsystem. The host processor, the voice trigger system, and the audio subsystem may be electrically connected to the system bus. The voice trigger system may be configured to perform a voice trigger operation and to issue a trigger event. The audio subsystem may be configured to replay an audio output stream through an audio interface. The direct bus may electrically connect the voice trigger system to the audio subsystem, and may be configured to provide a communication path between the voice trigger system and the audio subsystem during a barge-in condition in which the voice trigger operation and the replay of the audio output stream are performed together. While the replay of the audio output stream is performed through the audio interface during the barge-in condition, the application processor may be configured to generate compensated trigger data by performing an echo cancellation with respect to microphone data received from a microphone, and the voice trigger system may be configured to perform the voice trigger operation based on the compensated trigger data.

According to some embodiments, electronic devices may be provided. An electronic device may include an application processor and at least one audio input-output device. The application processor may include a system bus, a direct bus, a host processor, a voice trigger system, and an audio subsystem. The host processor, the voice trigger system, and the audio subsystem may be electrically connected to the system bus. The voice trigger system may be configured to perform a voice trigger operation and to issue a trigger event. The audio subsystem may be configured to replay an audio output stream through the at least one audio input-output device. The direct bus may electrically connect the voice trigger system to the audio subsystem, and may be configured to provide a communication path between the voice trigger system and the audio subsystem during a barge-in condition in which the voice trigger operation and the replay of the audio output stream are performed together. While the replay of the audio output stream is performed through the at least one audio input-output device during the barge-in condition, the application processor may be configured to generate compensated trigger data by performing an echo cancellation with respect to microphone data received from a microphone, and the voice trigger system may be configured to perform the voice trigger operation based on the compensated trigger data.

According to some embodiments, methods of operating an application processor may be provided. A method may include performing, by a voice trigger system, a voice trigger operation to issue a trigger event. The voice trigger system may be integrated with a host processor and an audio subsystem in a single semiconductor chip. The application processor may include a direct bus electrically connecting the voice trigger system and the audio subsystem. The application processor may include a system bus electrically connecting the host processor, the voice trigger system, and the audio subsystem. The method may include replaying, by the audio subsystem, an audio output stream through an audio interface. The method may include, during a barge-in condition in which the voice trigger operation and the replaying of the audio output stream are performed together, generating compensated trigger data by performing an echo cancellation with respect to microphone data received from a microphone. The direct bus may be configured to provide a communication path between the voice trigger system and the audio subsystem during the barge-in condition. The method may include performing, by the voice trigger system, the voice trigger operation based on the compensated trigger data.

The application processors, the electronic devices including an application processor, and the methods of operating an application processor according to some embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device.

In addition, the direct path between the voice trigger system and the audio subsystem may be provided using the direct bus during the barge-in condition, and the echo cancellation may be performed using the direct bus. Accordingly, data communication independent of the system bus may be performed using the on-chip voice trigger system and the direct bus while the echo cancellation is performed to reduce wakeup frequency of the application processor and the system bus to further reduce the power consumption and enhance the recognition rate of the voice trigger operation.

BRIEF DESCRIPTION OF THE DRAWINGS

Illustrative, non-limiting embodiments will be more clearly understood from the following detailed description taken in conjunction with the accompanying drawings.

FIG. 7 is a flow chart illustrating operations of methods of operating an application processor according to some embodiments.

DETAILED DESCRIPTION OF THE EMBODIMENTS

Figure 1:
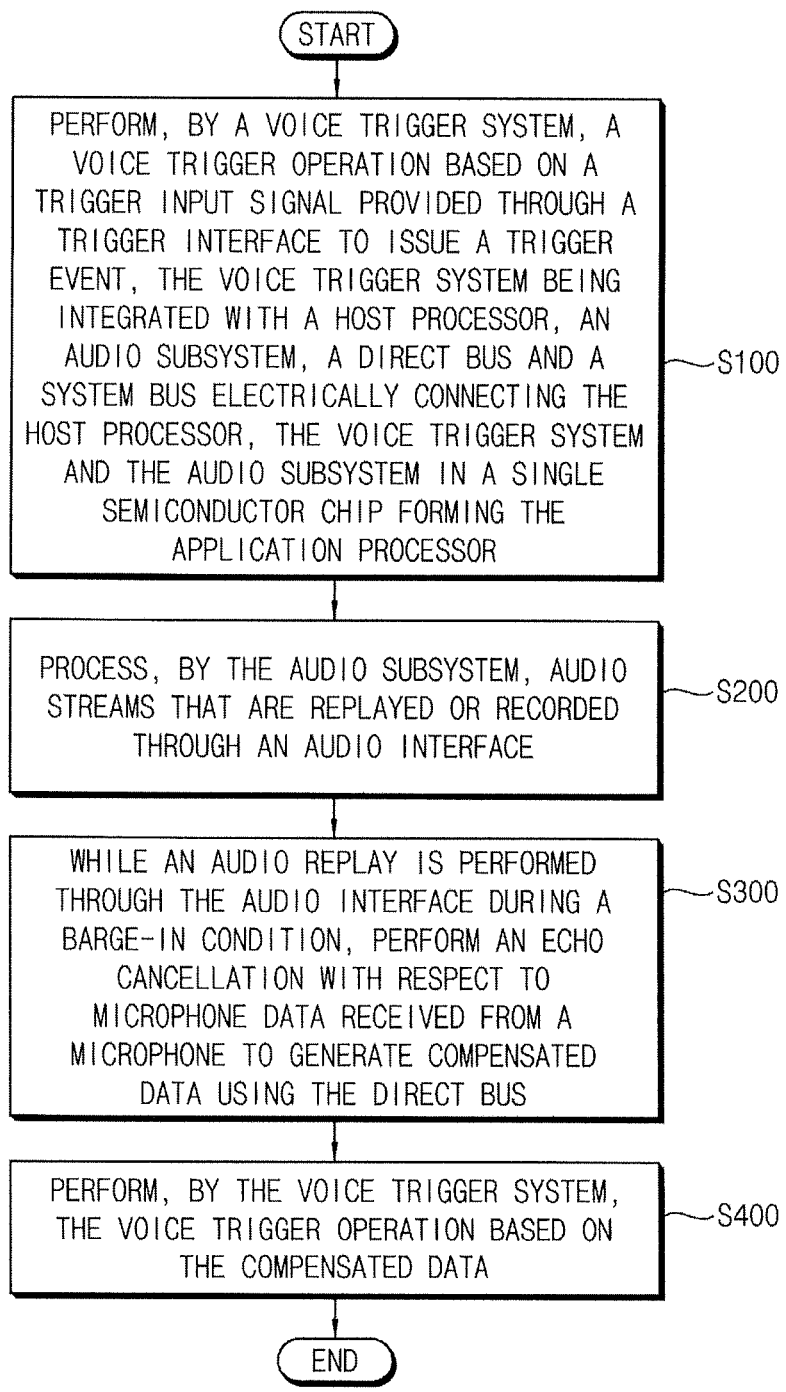
FIG. 1 is a flow chart illustrating operations of methods of operating an application processor according to some embodiments.

Various embodiments will be described more fully with reference to the accompanying drawings, in which some embodiments are shown. The present disclosure may, however, be embodied in many different forms and should not be construed as limited to the embodiments set forth herein. Like reference numerals refer to like elements throughout this application.

FIG. 1 is a flow chart illustrating operations of methods of operating an application processor according to some embodiments.

Referring to FIG. 1, in an application processor in which a host processor, a voice trigger system, an audio subsystem, a direct bus and a system bus electrically connecting the host processor, the voice trigger system, and the audio subsystem are integrated as a single semiconductor chip, a voice trigger operation may be performed by the voice trigger system based on a trigger input signal provided through a trigger interface to issue a trigger event (S100).

Audio streams that are replayed or recorded through an audio interface may be processed by the audio subsystem (S200). The audio subsystem may further support the transfer of the audio streams between the audio interface and a memory device.

The voice trigger operation may monitor whether the trigger input signal includes a particular trigger sound and issue a trigger event such as an interrupt signal to initiate a voice recognition mode or a voice-based intelligent interface when the trigger sound is detected. The initiation of the voice recognition mode may include launching the host processor and/or the system bus into an active mode. In other words, to reduce power consumption, the voice trigger operation may be performed during a sleep mode (e.g., while the system bus and the host processor are disabled and only the voice trigger system is enabled), and the system bus and the host processor may enter or wake up into the active mode when the trigger event is issued to initiate the voice recognition mode.

In some embodiments, the trigger sound may include a word and/or a phrase of a human voice. In some embodiments, the trigger sound may include sounds other than the human voice, such as a whistle, a sound of hand clapping, a siren, a sound of collision, a sound wave of a particular frequency range, etc.

As will be described with reference to FIG. 5, the direct bus may electrically connect the voice trigger system to the audio subsystem, and may provide a communication path between the voice trigger system and the audio subsystem during a barge-in condition in which the voice trigger operation and an audio replay are performed together. The communication path of the direct bus may be a direct path. In other words, during the barge-in condition, a data communication between the voice trigger system and the audio subsystem may be performed using the direct path independently of the system bus. As used herein, the direct bus may refer to a communication path between the voice trigger system and the audio subsystem such that data may be transferred between the voice trigger system and the audio subsystem while a host processor and a system bus are in a sleep mode without waking up the host processor and the system bus into an active mode.

While the audio replay is performed through the audio interface during the barge-in condition, an echo cancellation may be performed with respect to microphone data received from a microphone to generate compensated data using the direct bus (S300). The echo cancellation will be described with reference to FIG. 4.

The voice trigger operation is performed by the voice trigger system based on the compensated data (S400).

The application processor, the electronic device including the application processor, and the method of operating the application processor according to some embodiments may perform the voice trigger operation with low power and high efficiency by integrating the voice trigger system in the application processor. In addition, during the barge-in condition, the echo cancellation may be performed through the direct path independently of the system bus and the host processor. Accordingly, the audio replay may be performed with low power and accuracy (e.g., a recognition rate) of the voice trigger operation may be enhanced.

Figure 2A:
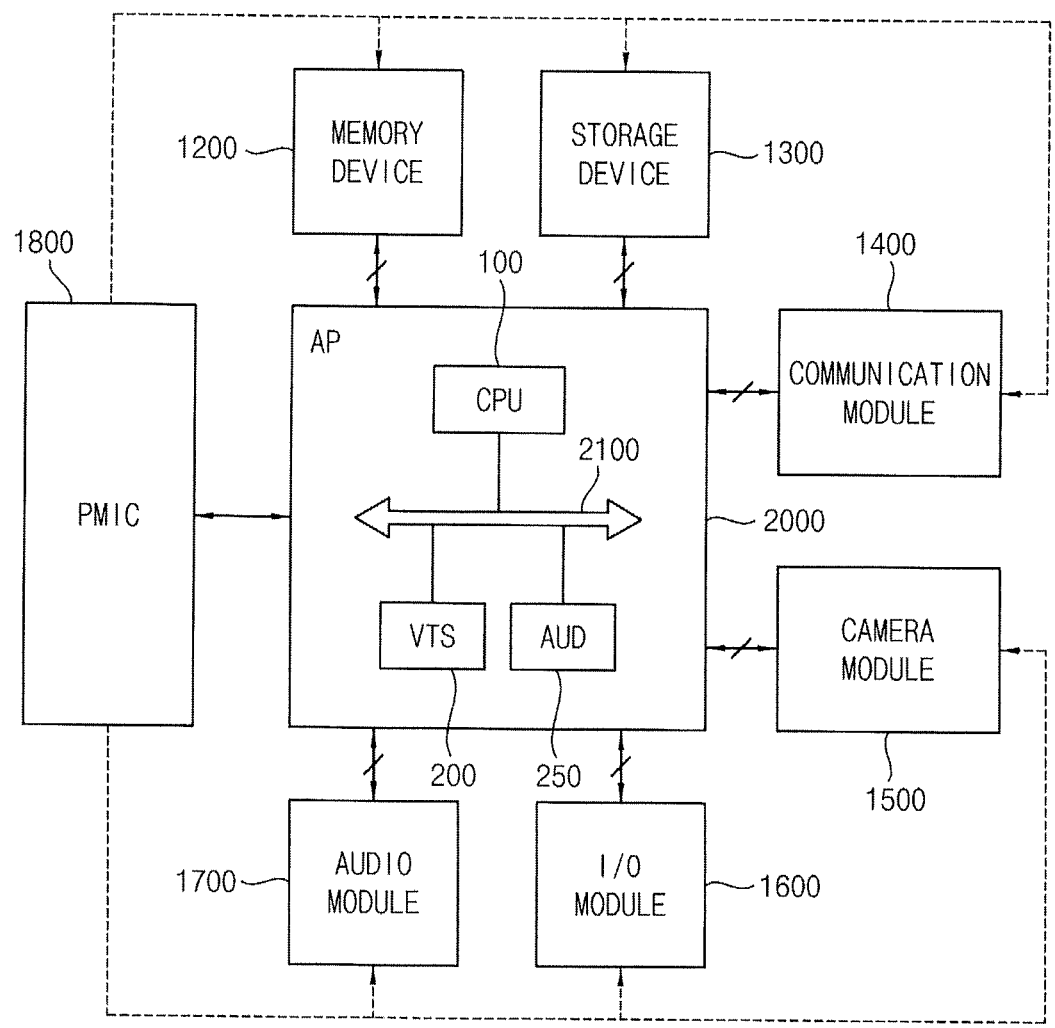
FIG. 2A is a block diagram illustrating an electronic device according to some embodiments.

FIG. 2A is a block diagram illustrating an electronic device according to some embodiments.

Referring to FIG. 2A, an electronic device 1000 may include an application processor AP 2000, a memory device 1200, a storage device 1300, a plurality of functional modules 1400, 1500, 1600, and 1700, and a power management integrated circuit PMIC 1800.

The application processor 2000 may control some overall operations of the electronic device 1000. For example, the application processor 2000 may control the memory device 1200, the storage device 1300, and/or the plurality of functional modules 1400, 1500, 1600, and 1700. The application processor 2000 may be a system on chip (SoC).

The application processor 2000 may include a system bus 2100, a host processor or a central processing unit (CPU) 100, a voice trigger system VTS 200, and/or an audio processing system AUD 250 electrically connected to the system bus 2100.

The voice trigger system 200 may be electrically connected to the system bus 2100, perform a voice trigger operation, and issue a trigger event based on a trigger input signal that is provided through a trigger interface. The audio processing system 250 may include an audio subsystem and further include a sensor hub as will be described. The audio subsystem may be electrically connected to the system bus 2100 to process audio streams that are replayed or recorded through an audio interface. In addition, the audio subsystem may further support the transfer of the audio streams between the audio interface and the memory device 1200. Some embodiments of the voice trigger system 200 and the audio processing system 250 will be described with reference to FIGS. 3 through 18B.

The memory device 1200 and/or the storage device 1300 may store data for operations of the electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some embodiments, the storage device 1300 may include an embedded multimedia card (eMMC), a universal flash storage (UFS), a solid state drive (SSD), a hard disk drive (HDD), a CD-ROM, etc.

The functional modules 1400, 1500, 1600, and 1700 may perform various functions of the electronic device 1000. For example, the electronic device 1000 may include a communication module 1400 that may perform a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), a camera module 1500 that may perform a camera function, an input-output (I/O) module 1600 including a display module that may perform a display function and/or a touch panel module that may perform a touch sensing function, and an audio module 1700 including a microphone (MIC) module, a speaker module, etc. that may perform input and/or output of audio signals. In some embodiments, the electronic device 1000 may include a global positioning system (GPS) module, a gyroscope module, etc. However, the functional modules 1400, 1500, 1600, and 1700 in the electronic device 1000 are not limited thereto.

The power management integrated circuit 1800 may provide one or more operating voltages to the application processor 2000, the memory device 1200, the storage device 1300, and/or the functional modules 1400, 1500, 1600, and 1700.

Figure 2B:
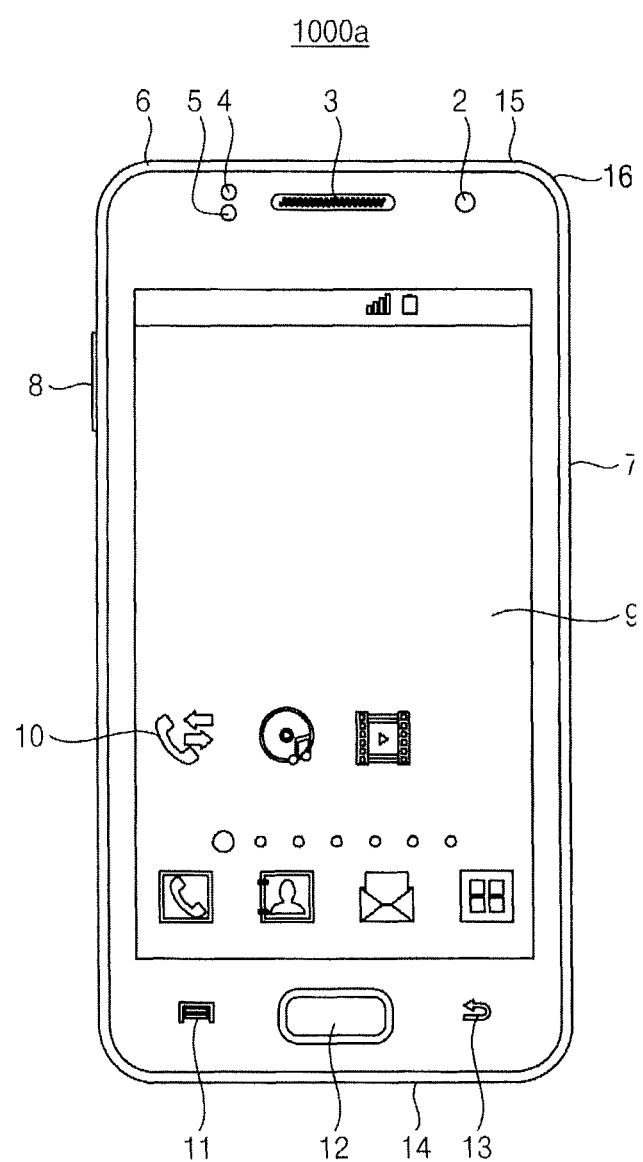
FIG. 2B is a front view illustrating an implementation of the electronic device of FIG. 2A according to some embodiments.

FIG. 2B is a front view illustrating an implementation of the electronic device of FIG. 2A according to some embodiments.

The electronic device 1000 of FIG. 2A may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc. The electronic device 1000 may typically be operated in response to direct user input, but may also be used to communicate with other devices via the Internet or other network systems. FIG. 2B illustrates an electronic device 1000a as a cellular phone or a smart phone including a touch screen as an example of the electronic device 1000 of FIG. 2A.

Referring to FIG. 2B, the electronic device 1000a may include a front camera 2, a speaker 3, a proximity sensor 4, a luminance sensor 5, a universal serial bus (USB) interface 6, a power button 7, a volume button 8, a display and touch screen 9, icons 10, a menu button 11, a home button 12, a back button 13, a microphone 14, an audio output interface 15, and/or an antenna 16.

The front camera 2 may face in a direction in which the display and touch screen 9 and is used for a video call or video or photo shooting. The speaker 3 may output audio data when a user plays multimedia data by touching the display and touch screen 9 on one of the icons 10 or inputting a signal by speech, talks with another user over a public switched telephone network, or plays an operation sound of the electronic device 1000a or a notification sound. The proximity sensor 4 may control on or off of the display and touch screen 9 in order to save power and prevent miss-operation when a user holds the electronic device 1000a up to an ear for telephone conversation. The luminance sensor 5 may control the operations of the display and touch screen 9 and the front camera 2 according to the quantity of incident light from the surroundings of the electronic device 1000a. The USB interface 6 may be an input/output interface for data communication with external devices and power supply.

The power button 7 may turn on or off the power of the electronic device 1000a and/or may turn on or off the display and touch screen 9. The volume button 8 may control the audio output of the speaker 3. The icons 10 corresponding to different functions may be displayed on the display and touch screen 9. For example, a user may touch an icon 10 corresponding to playback of multimedia data.

The menu button 11 may allow a user to browse a menu including icons and settings. The home button 12 may allow a home screen to appear for multi-working mode even while the electronic device 1 is performing a certain operation on the display and touch screen 9. The back button 13 may cancel an operation which is currently being performed by the electronic device 1000a and returns a user to a previous screen.

The microphone 14 may be an input-output (I/O) interface for voice calls and/or voice input signals. The audio output interface 15, e.g., an earphone jack, may be for audio output of multimedia data which is being played. Alternatively, audio output and/or microphone input may be interfaced wirelessly, for example through a device supporting Bluetooth. The antenna 16 may be used to receive digital media broadcasting service. The elements of the electronic device 1000a may be embodied in various ways realizable to those of ordinary skill in the art. Some of the elements in FIG. 2B may be omitted or replaced with other elements.

Figure 3:
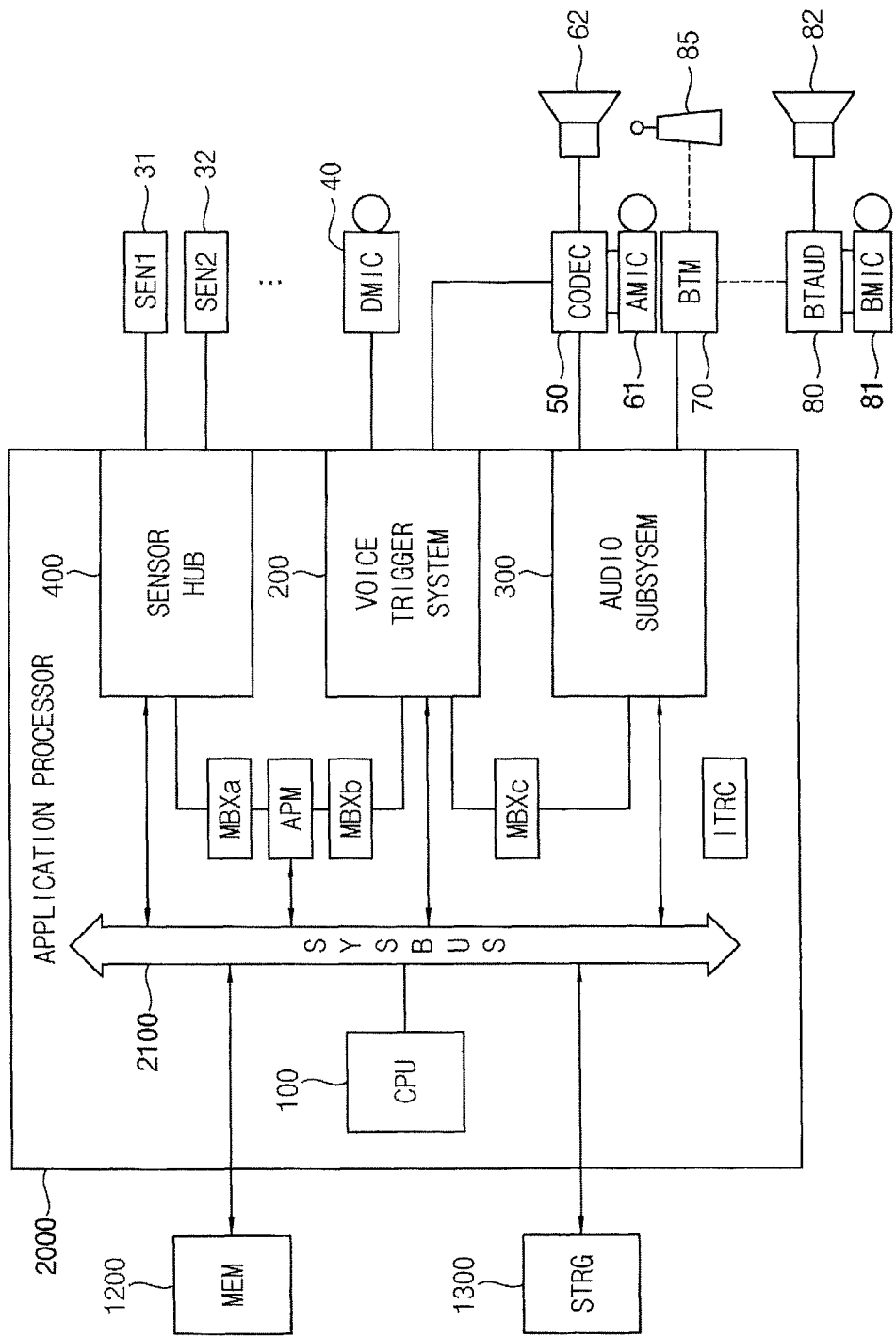
FIG. 3 is a block diagram illustrating an application processor according to some embodiments.

FIG. 3 is a block diagram illustrating an application processor according to some embodiments.

Referring to FIG. 3, an application processor 2000 may include a system bus SYSBUS 2100, a host processor CPU 100, a voice trigger system 200, an audio subsystem 300, and a sensor hub 400. The audio subsystem 300 and the sensor hub 400 may be included in the audio processing system 250 in FIG. 2A. According to some embodiments, the application processor 2000 may further include an active power manager APM, mail box modules MBXa, MBXb and MBXc, and an interrupt controller ITRC.

The system bus 2100 may be referred to as an interconnect device or a backbone. In some embodiments, the system bus 2100 may include a higher-layer bus, a lower-layer bus and a bridge connecting them. For example, the system bus 2100 may include various buses such as an advanced extensible interface (AXI), an advanced high-performance bus (AHB), an advanced peripheral bus (APB), etc. and at least one bridge connecting them. The host processor 100 may access external devices such as a memory device 1200 and/or a storage device 1300 through the system bus 2100. In addition, the host processor 100 may communicate with the voice trigger system 200, the audio subsystem 300 and the sensor hub 400 through the system bus 2100.

Although one interrupt controller ITRC is illustrated in FIG. 3 for convenience of illustration, the interrupt controller ITRC may include at least one general interrupt controller (GIC), at least one vectored interrupt controller (VIC), etc. For example, the interrupt controller ITRC may be implemented as a programmable interrupt controller (PIC). The programmable interrupt controller may be implemented with multiple layers having a priority system represented by vectors. The programmable interrupt controller may receive an interrupt signal from peripheral devices, determine priorities of the received interrupt signal and issue an interrupt signal with a pointer address to a processor or a controller.

The active power manager APM may manage powers of the application processor 2000. The active power manager APM may manage powers supplied to respective regions or function blocks of the application processor 2000. The mail box modules MBXa, MBXb and MBXc may support a synchronization of data communication between the elements in the application processor 2000 or data communication between the application processor 2000 and external devices. The mail box modules MBXa, MBXb and MBXc will be described with reference to FIG. 6B.

Although FIG. 3 illustrates the voice trigger system 200 and the audio subsystem 300 connected to each other through one mail box module MBXc, and the voice trigger system 200 and the sensor hub 400 connected to each other through one active power manager APM and two mail box modules MBXa and MBXb, inventive concepts are not limited thereto. For example, in some embodiments, the voice trigger system 200 and the audio subsystem 300 may be connected to each other through one active power manager and two mail box modules, and/or the voice trigger system 200 and the sensor hub 400 may be connected to each other through one mail box module.

The voice trigger system 200 may be electrically connected to the system bus 2100. The voice trigger system 200 may perform a voice trigger operation and may issue a trigger event based on a trigger input signal that is provided through a trigger interface. The trigger input signal may be an audio input signal. In some embodiments, the voice trigger system 200 may receive the trigger input signal from a digital microphone DMIC 40 and/or an audio codec (coder and decoder) CODEC 50. In other words, the trigger interface of the voice trigger system 200 may be connected directly to the digital microphone 40 and the audio codec 50. The audio codec 50 may perform encoding and decoding (or analog-to-digital conversion (ADC) and digital-to-analog conversion (DAC)) of an audio signal received from the digital microphone 40 or an analog microphone AMIC 61 and an audio signal output to a speaker 62. The digital microphone 40 may be an on-board microphone that is mounted with the application processor 2000 on a board of the electronic device. In some embodiments, one or both of the analog microphone 61 and the speaker 62 may be devices attached and detachable from terminals of the audio codec 50.

The audio subsystem 300 may be electrically connected to the system bus 2100. The audio subsystem 300 may process audio streams that are replayed or recorded through an audio interface and may support transfer of the audio streams between the memory device 1200 and the audio interface. In some embodiments, the audio subsystem 300 may exchange the audio streams with the audio codec 50 and/or a Bluetooth module BTM 70. In other words, the audio interface of the audio subsystem 300 may be connected directly to the audio codec 50 and/or the Bluetooth module 70. The Bluetooth module 70 may be connected to a Bluetooth microphone BMIC 81 and a Bluetooth speaker 82 through a Bluetooth audio module BTAUD 80 to receive the audio signal from the Bluetooth microphone 81 and output the audio signal to the Bluetooth speaker 82. The Bluetooth module 70 may be connected directly to another Bluetooth speaker 85 or another Bluetooth device. In some embodiments, the audio subsystem 300 may be connected to a universal serial bus (USB) module to exchange the audio stream with the USB module.

The sensor hub 400 may be electrically connected to the system bus. The sensor hub 400 may process signals provided from one or more sensors SEN1 31 and SEN2 32. The sensor hub 400 may measure physical quantities associated with the electronic device and process to detect operation status of the electronic device and process the detected information. For example, the sensors 31 and 32 may include a motion sensor, a gyro sensor, an atmospheric pressure sensor, a magnetic sensor, an accelerometer, a grip sensor, a proximity sensor, a biometric sensor, a temperature/humidity sensor, an illumination sensor, and an ultra violet (UV) sensor, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor.

In some embodiments, as illustrated in FIG. 3, all of the system bus 2100, the voice trigger system 200, the audio subsystem 300 and the sensor hub 400 may be integrated in a single semiconductor chip forming the application processor 2000. In some embodiments, the system bus 2100, the voice trigger system 200 and the audio subsystem 300 may be integrated in a single chip and the sensor hub 400 may be external to the application processor 2000. Further, a direct bus 500 described with reference to FIG. 5 may also be integrated in the application processor 2000.

Figure 4:
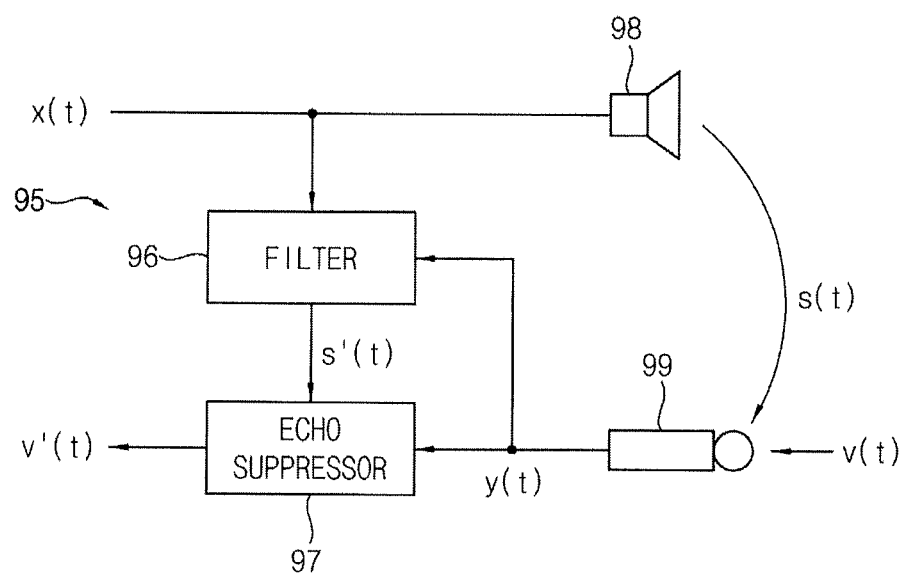
FIG. 4 is a block diagram illustrating an echo canceller included in an application processor according to some embodiments.

FIG. 4 is a block diagram illustrating an echo canceller included in an application processor according to some embodiments.

Referring to FIG. 4, an acoustic echo canceller or an echo canceller 95 may include a filter 96 and an echo suppressor 97.

An audio output signal x(t) provided from the audio subsystem 300 may output from a speaker 98 and output to a user. A microphone 99 may receive an audio input signal y(t). Although not shown, a digital-to-analog conversion (DAC) may be applied to the audio output signal x(t) (e.g., a digital signal) before playout from the speaker 98, and an analog-to-digital conversion (ADC) may be applied to a signal captured by the microphone 99 to arrive at the audio input signal y(t) (e.g., a digital signal).

The audio input signal y(t) received by the microphone 99 may include a near-end signal v(t) and an echo signal s(t). The near-end signal v(t) may be referred to as a desired signal or primary signal that the user intends for the microphone 99 to receive. The echo signal s(t) may include an echo component resulting from audio signals outputted from the speaker 98. Although not shown, the audio input signal y(t) may further include noise. The echo component and/or the noise may act as interferences for the near-end signal v(t), and thus it may be beneficial to reduce, cancel, or remove the echo component and/or the noise.

In some embodiments, at least one of various algorithms such as doubletalk detection, step-size control, etc. may be used to perform the echo cancellation.

The filter 96 may estimate the echo signal s(t) included in the audio input signal y(t) based on the audio output signal x(t) and the audio input signal y(t) to generate an estimated echo signal s'(t). In other words, the filter 96 may model the echo component in the audio input signal y(t) and an echo path causing the echo component, and estimate how the echo path changes the desired audio output signal x(t) to an undesired echo component in the audio input signal y(t). The audio output signal x(t) may be used as a reference signal.

The echo path describes the effects of acoustic paths travelled by a far-end signal from the speaker 98 to the microphone 99. The far-end signal may travel directly from the speaker 98 to the microphone 99, or it may be reflected from various surfaces in an environment of a near-end terminal. The echo path traversed by the far-end signal output from the speaker 98 may be regarded as a system having a frequency and a phase response which may vary over time.

In some embodiments, the echo path may be modeled based on at least one of various linear filters such as a finite impulse response (FIR) filter, an infinite impulse response (IIR) filter, etc. For example, the estimate of the echo path may be a vector having (N+1) values where N is a natural number, and the filter 96 may be implemented as an N-th order filter having a finite length (in time).

In some embodiments, the estimate of the echo path may not need to be explicitly calculated, but may be represented by means of filter coefficients obtained from at least one of various stochastic gradient algorithms such as Least Mean Squares (LMS), Normalized Least Mean Squares (NLMS), Fast Affine Projection (FAP) and Recursive Least Squares (RLS), etc.

In some embodiments, the estimate of the echo path may be continuously updated in time.

The echo suppressor 97 may generate an estimated near-end signal v'(t) based on the estimated echo signal s'(t) and the audio input signal y(t). For example, the echo suppressor 97 may apply an echo suppression to the audio input signal y(t) based on the estimated echo signal s'(t) to generate the estimated near-end signal v'(t), thereby suppressing the echo in the received audio signal. The estimated near-end signal v'(t) may be closer to the near-end signal v(t) as the echo path is more precisely estimated.

In some embodiments, the echo suppressor 97 may be implemented as echo subtractor. For example, the echo subtractor may subtract the estimated echo signal s'(t) from the audio input signal y(t) to generate the estimated near-end signal v'(t).

According to some embodiments, the elements in the echo canceller 95 may be implemented with various configurations, some elements in the echo canceller 95 may be omitted or replaced with other elements, and some elements may be added to the echo canceller 95. According to some embodiments, at least a part of the echo canceller 95 may be implemented as hardware, or as instructions and/or program routines (e.g., a software program).

Figure 5:
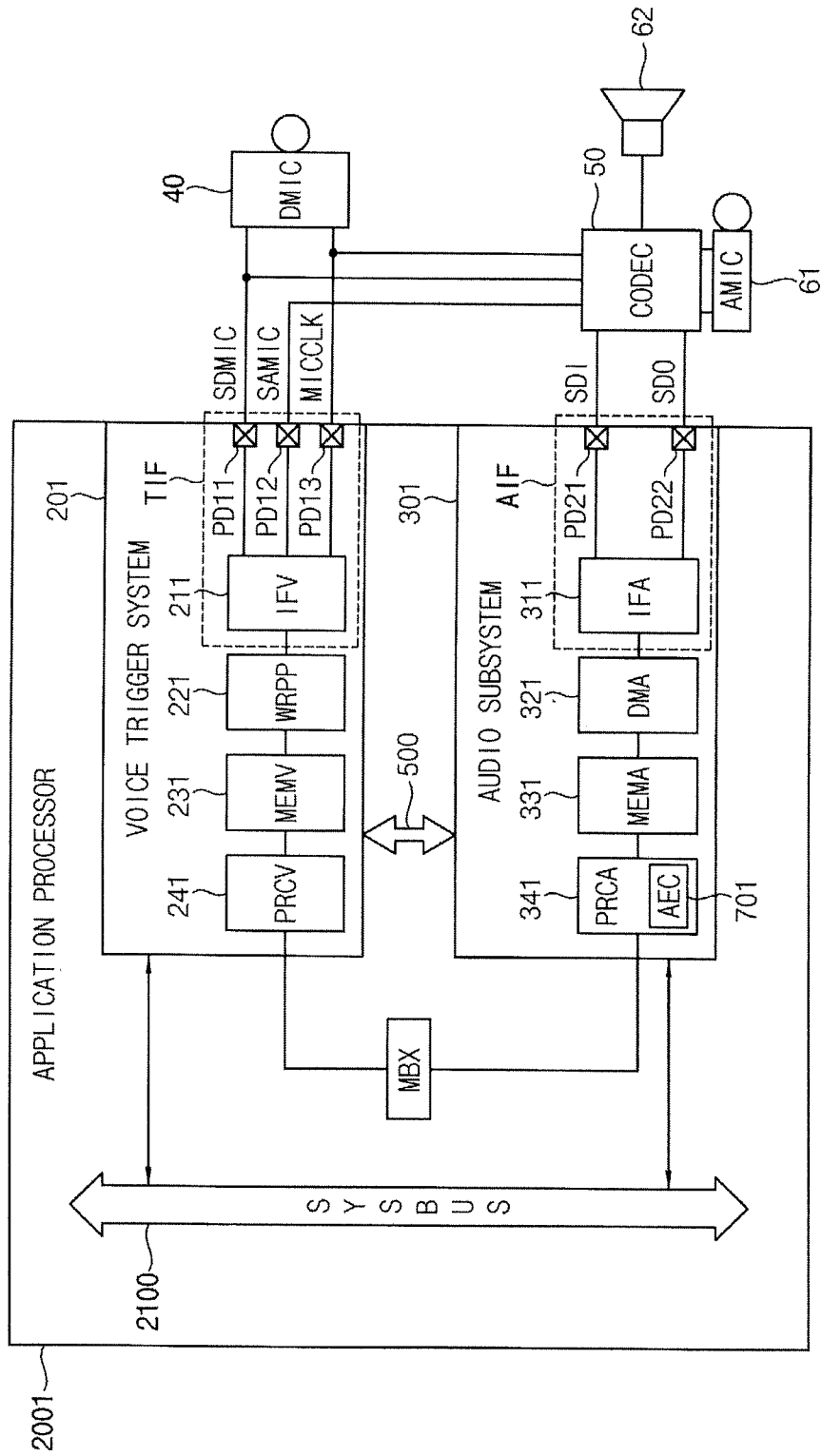
FIG. 5 is a block diagram illustrating a connection between a voice trigger system and an audio subsystem in an application processor according to some embodiments.

FIG. 5 is a block diagram illustrating a connection between a voice trigger system and an audio subsystem in an application processor according to some embodiments. The host processor 100 and other elements of FIG. 3 may be omitted in FIG. 5 for convenience of illustration and the descriptions repeated with FIG. 3 may be omitted.

Referring to FIG. 5, an application processor 2001 may include a system bus SYSBUS 2100, a voice trigger system 201, an audio subsystem 301, a direct bus 500, and a mail box module MBX. The audio subsystem 301 may be included in the audio processing system 250 of FIG. 2A.

The voice trigger system 201 may be electrically connected to the system bus 2100. The voice trigger system 201 may perform a voice trigger operation based on trigger input signals SDMIC and SAMIC provided through a trigger interface TIF. The voice trigger system 201 may receive the trigger input signal SDMIC from a digital microphone DMIC 40 and/or the trigger input signal SAMIC from an audio codec (coder and decoder) CODEC 50. A microphone clock signal MICCLK may be transferred between the voice trigger system 201, the digital microphone 40 and the audio codec 50 for synchronization of a signal transfer. The trigger input signals SDMIC and SAMIC and the microphone clock signal MICCLK may be transferred through pads PD11, PD12, and PD13, respectively. The pads PD11, PD12 and PD13 may be implemented to reduce or prevent interference between the pads PD11, PD12 and PD13.

The audio subsystem 301 may be electrically connected to the system bus 2100. The audio subsystem 301 may process audio streams that are replayed or recorded through an audio interface AIF and may support transfer of the audio streams between the memory device 1200 and the audio interface AIF. In some embodiments, the audio subsystem 301 may exchange the audio streams with the audio codec 50. The audio subsystem 301 may receive an audio input signal SDI through an audio input pad PD21 from the audio codec 50 and may transmit an audio output signal SDO through an audio output pad PD22 to the audio codec 50.

The voice trigger system 201 may include a trigger interface circuit IFV 211, a wrapper WRPP 221, a trigger memory MEMV 231 and a trigger processor PRCV 241.

The trigger interface circuit 211 and the pads PD11, PD12 and PD13 may form the trigger interface TIF to sample and convert the trigger input signals SDMIC and SAMIC provided from the digital microphone 40 or the audio codec 50. The wrapper 221 may store data provided from trigger interface circuit 211 in the trigger memory 231. The wrapper 221 may issue an interrupt signal to the trigger processor 241 when a predetermined amount of data is stored in the trigger memory 231 so that the trigger processor 241 may perform the voice trigger operation based on data stored in the trigger memory 231.

In some embodiments, the voice trigger system 201 may receive a pulse density modulation (PDM) signal as the trigger input signals SDMIC and SAMIC. The trigger interface circuit 211 may convert the PDM signal to a pulse code modulation (PCM) data. The wrapper 221 may store the PCM data in the trigger memory 231. The wrapper 221 may be implemented with a direct memory access controller.

The audio subsystem 301 may include an audio interface circuit IFA 311, a direct memory access controller DMA 321, an audio memory MEMA 331 and an audio processor PRCA 341.

The audio interface circuit 311 and the pads PD21 and PD22 may form the audio interface AIF to transfer the audio streams through the audio input signal SDI and the audio output signal SDO. The audio memory 331 may store data of the audio streams, and the direct memory access controller 321 may control access to the audio memory, that is, data read from the audio memory 331 and data write to the audio memory 331. The audio processor 341 may process data stored in the audio memory 331.

In some embodiments, the audio processor 341 in the audio subsystem 301 may include an echo canceller AEC 701. The echo canceller 701 may be the echo canceller 95 described with reference to FIG. 4.

In some embodiments, the audio interface circuit 311 may be compatible with I2S or IIS (Inter-IC Sound or Integrated Interchip Sound) standard. In some embodiments, the audio interface circuit 311 may operate based on clock signals according to the I2S standard. In some embodiments, the audio interface circuit 311 may be connected directly to the digital microphone 40 and/or the audio codec 50.

The direct bus 500 may electrically connect the voice trigger system 201 and the audio subsystem 301. The direct bus 500 may provide a direct path between the voice trigger system 201 and the audio subsystem 301 during a barge-in condition in which the voice trigger operation and the audio replay are performed together (e.g., a sound input and a sound output are simultaneously or concurrently performed). In other words, the barge-in condition (or simply barge-in) may refer to a condition in which the audio replay is performed by the audio subsystem 301 while the voice trigger operation is performed by the voice trigger system 201. The direct bus 500 will be described with reference to FIG. 6A.

Performing an echo cancellation during the barge-in condition may enhance a recognition rate of the voice trigger operation. While the audio replay is performed through the audio interface AIF during the barge-in condition, the application processor 2001 according to some embodiments may perform the echo cancellation with respect to microphone data received from a microphone (e.g., the digital microphone 40 or the analog microphone 61) to generate compensated data using the direct bus 500, and the voice trigger system 201 may perform the voice trigger operation based on the compensated data. The echo cancellation may be performed by the echo canceller 701 in the audio subsystem 301.

In addition, the application processor 2001 may further include the mail box module MBX supporting a synchronization of a data transmission or a data communication between the voice trigger system 201 and the audio subsystem 301.

The application processor 2001 may perform the data communication between the voice trigger system 201 and the audio subsystem 301 through the direct bus 500 and the mail box module MBX independently of the system bus 2100. As such, while the audio replay is performed through the audio interface AIF, and while the echo cancellation is performed, the host processor 100 and the system bus 2100 may maintain a sleep mode and may not wake up into an active mode for the voice trigger operation.

Figure 6A:
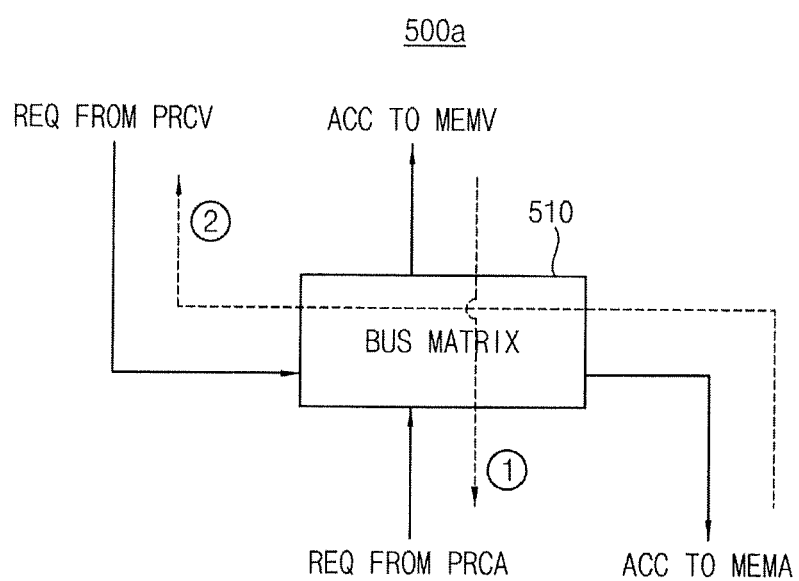
FIG. 6A is a block diagram illustrating a direct bus included in the application processor of FIG. 5 according to some embodiments.

FIG. 6A is a block diagram illustrating a direct bus included in the application processor of FIG. 5 according to some embodiments.

Referring to FIGS. 5 and 6A, a direct bus 500a may include a bus matrix 510, a first direct path ① and a second direct path ②. The direct bus 500a of FIG. 6A may be an example of the direct bus 500 of FIG. 5 according to some embodiments.

The direct bus 500a may provide a direct path between the voice trigger system 201 and the audio subsystem 301 to perform an echo cancellation during a barge-in condition. The direct path may include the first direct path ① that provides a path for a first data transmission from the voice trigger system 201 to the audio subsystem 301, and the second direct path ② that provides a path for a second data transmission from the audio subsystem 301 to the voice trigger system 201.

The first direct path ① may be used by the audio subsystem 301 when the audio subsystem 301 requires data stored in the voice trigger system 201. For example, the audio processor 341 may issue a data request (REQ FROM PRCA) and perform an access (ACC TO MEMV) to the trigger memory 231, and thus data stored in the trigger memory 231 may be transferred through the first direct path ① to the audio subsystem 301 and the audio processor 341.

The second direct path ② may be used by the voice trigger system 201 when the voice trigger system 201 requires data stored in the audio subsystem 301. For example, the trigger processor 241 may issue a data request (REQ FROM PRCV) and perform an access (ACC TO MEMA) to the audio memory 331, and thus data stored in the audio memory 331 may be transferred through the second direct path ② to the voice trigger system 201 and the trigger processor 241.

The data request (REQ FROM PRCA), the data request (REQ FROM PRCV), the access (ACC TO MEMV) and the access (ACC TO MEMA) may be controlled by the bus matrix 510.

The voice trigger system 201 and the audio subsystem 301 may directly exchange data through the bus matrix 510, the first direct path ①, and the second direct path ② without passing through the system bus 2100 (e.g., independently of the system bus 2100). Accordingly, data communication independent of the system bus 2100 may be performed using the on-chip voice trigger system and the direct bus while the echo cancellation is performed to reduce wakeup frequency of the application processor and the system bus 2100 to further reduce the power consumption and enhance the recognition rate of the voice trigger operation.

Figure 6B:
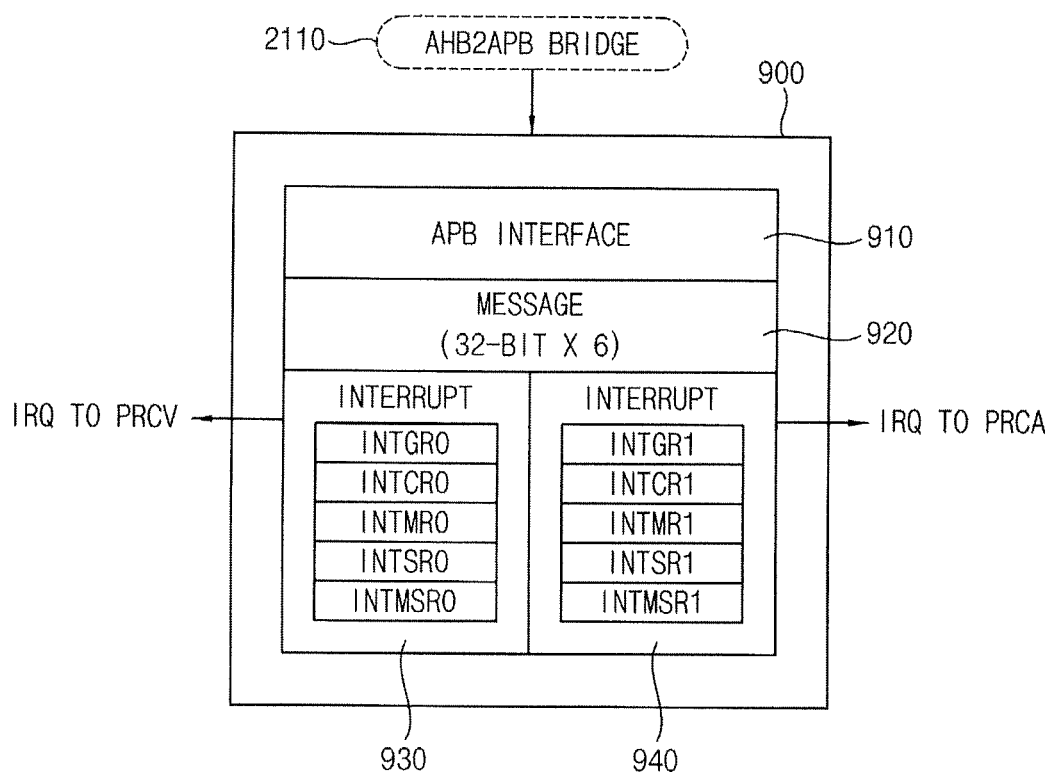
FIG. 6B is a block diagram illustrating an embodiment of a mail box module included in the application processor of FIG. 5 according to some embodiments.

FIG. 6B is a block diagram illustrating an embodiment of a mail box module included in the application processor of FIG. 5 according to some embodiments.

Referring to FIG. 6B, a mail box module 900 may include an interface 910, a message box 920, a first register circuit 930 including a plurality of registers INTGR0, INTCR0, INTMR0, INTSR0, and INTMSR0, and a second register circuit 940 including a plurality of registers INTGR1, INTCR1, INTMR1, INTSR1, and INTMSR1. The mail box module 900 of FIG. 6B may be an example of the mail box module MBX of FIG. 5 according to some embodiments. FIG. 6B illustrates a non-limiting example that the mail box module 900 is connected to an AHB2APB bridge 2110 of the system bus 2100 through an APB interface and the message box 920 is implemented with shared registers of 6*32 bits, however embodiments are not limited thereto. The type of the interface 910, the number and the bit number of the registers in the message box 920 may be determined variously. The first register circuit 930 may generate an interrupt signal (IRQ TO PRCV) provided to the trigger processor 241 in the voice trigger system 201 and the second register circuit 940 may generate an interrupt signal (IRQ TO PRCA) provided to the audio processor 341 in the audio subsystem 301. The data transmission between the voice trigger system 201 and the audio subsystem 301 may be synchronized using the mail box module 900.

The mail box module 900 may perform a bilateral communication by transmitting an interrupt signal after one of the trigger processor 241 and the audio processor 341 writes a message in the message box 920. The synchronization of the data transmission between the voice trigger system 201 and the audio subsystem 301 may be implemented through a polling method, etc.

Figure 8:
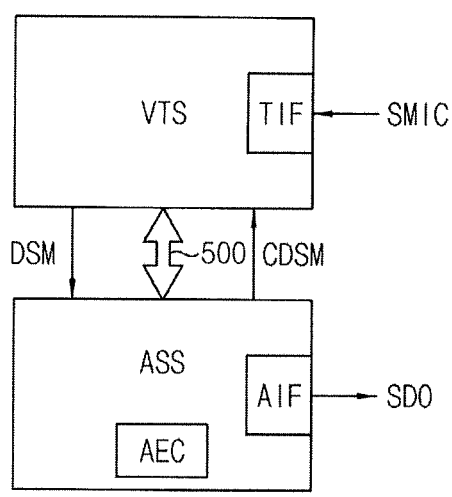
FIG. 8 is a block diagram illustrating a voice trigger system and an audio subsystem performing operations of the methods of operating the application processor of FIG. 7 according to some embodiments.

FIG. 7 is a flow chart illustrating operations of methods of operating an application processor according to some embodiments. FIG. 8 is a block diagram illustrating a voice trigger system and an audio subsystem performing operations of the methods of operating the application processor of FIG. 7.

Referring to FIGS. 7 and 8, while an audio replay is performed by an audio subsystem ASS through an output pad of an audio interface AIF based on audio output data corresponding to an audio output signal SDO, a voice trigger system VTS may receive a trigger input signal SMIC through a trigger interface TIF (S510).

The voice trigger system VTS may transfer sample data DSM of the trigger input signal SMIC to the audio subsystem ASS (S520). For example, the sample data DSM may be transferred through a first direct path (e.g., the first direct path ① in FIG. 6A) in the direct bus 500 without passing through the system bus 2100. Accordingly, during a barge-in condition, the host processor 100 and the system bus 2100 may maintain a sleep mode and the transfer of the sample data DSM may not wake up the host processor 100 and the system bus 2100 into an active mode.

An echo canceller AEC in the audio subsystem ASS may perform an echo cancellation with respect to the sample data DSM based on the audio output data corresponding to the audio output signal SDO to generate compensated sample data CDSM (S530). The audio output data may be used as a reference signal, and the sample data DSM may be used as a received signal for the echo cancellation.

The audio subsystem ASS may transfer the compensated sample data CDSM to the voice trigger system VTS (S540). For example, the compensated sample data CDSM may be transferred through a second direct path (e.g., the second direct path ② in FIG. 6A) in the direct bus 500 without passing through the system bus 2100. Accordingly, during a barge-in condition, the host processor 100 and the system bus 2100 may maintain a sleep mode and the transfer of the compensated sample data CDSM may not wake up the host processor 100 and the system bus 2100 into an active mode.

The voice trigger system VTS may perform a voice trigger operation based on the compensated sample data. CDSM (S550). The voice trigger operation may be performed based on the compensated sample data CDSM to which the echo cancellation is applied, and thus a recognition rate of the voice trigger operation may be enhanced.

Figure 9:
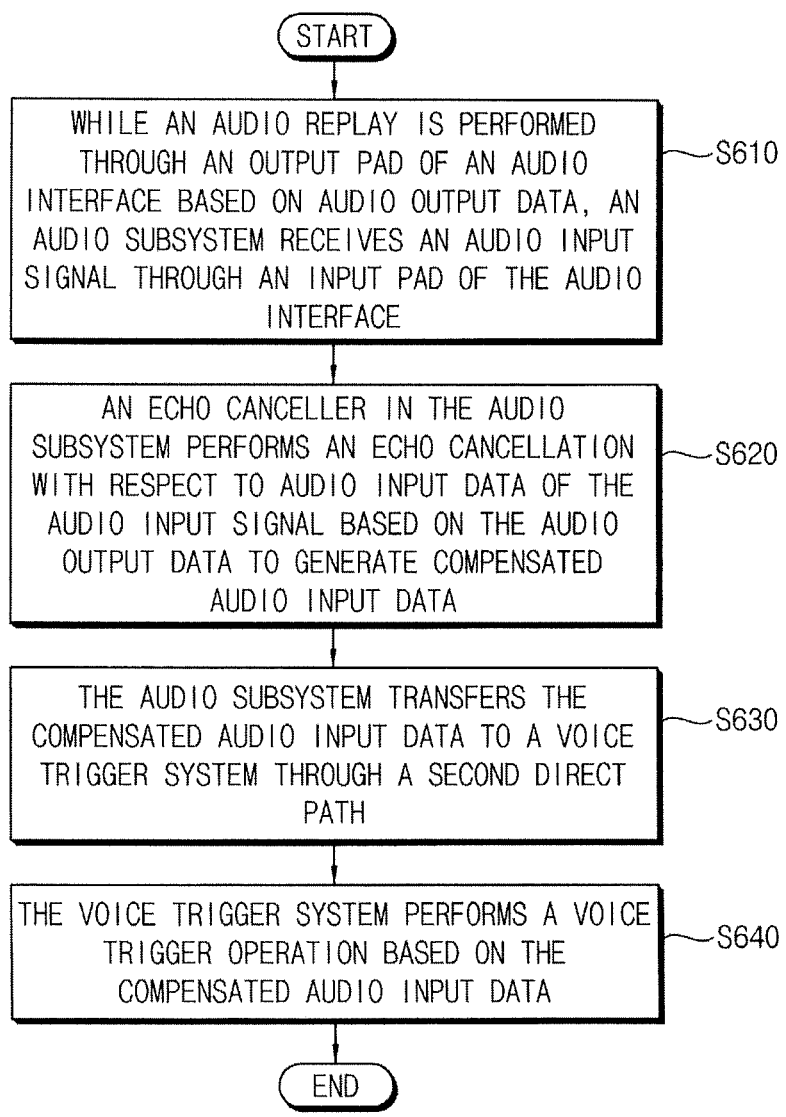
FIG. 9 is a flow chart illustrating operations of methods of operating an application processor according to some embodiments.
Figure 10:
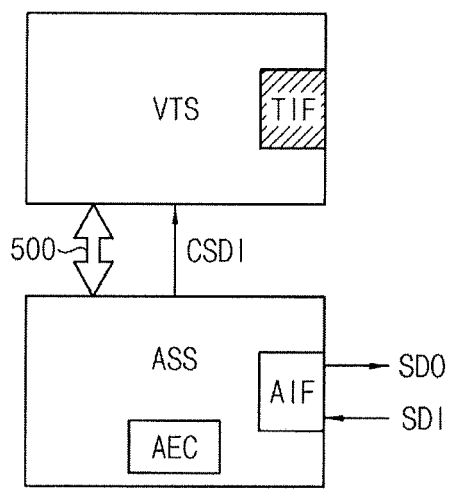
FIG. 10 is a block diagram illustrating a voice trigger system and an audio subsystem performing operations of the methods of operating the application processor of FIG. 9 according to some embodiments.

FIG. 9 is a flow chart illustrating operations of methods of operating an application processor according to some embodiments. FIG. 10 is a block diagram illustrating a voice trigger system and an audio subsystem performing operations of the methods of operating the application processor of FIG. 9 according to some embodiments.

Referring to FIGS. 9 and 10, while an audio replay is performed by an audio subsystem ASS through an output pad of an audio interface AIF based on audio output data corresponding to an audio output signal SDO, the audio subsystem ASS may receive an audio input signal SDI through an input pad of the audio interface AIF (S610).

An echo canceller AEC in the audio subsystem ASS may perform an echo cancellation with respect to audio input data of the audio input signal SDI based on the audio output data corresponding to the audio output signal SDO to generate compensated audio input data CSDI (S620). The audio output data may be used as a reference signal, and the audio input data may be used as a received signal for the echo cancellation.

The audio subsystem ASS may transfer the compensated audio input data CSDI to the voice trigger system VTS (S630). For example, the compensated audio input data CSDI may be transferred through a second direct path (e.g., the second direct path ② in FIG. 6A) in the direct bus 500 without passing through the system bus 2100. Accordingly, during a barge-in condition, the host processor 100 and the system bus 2100 may maintain a sleep mode and the transfer of the compensated audio input data CSDI may not wake up the host processor 100 and the system bus 2100 into an active mode.

The voice trigger system VTS may perform a voice trigger operation based on the compensated audio input data CSDI (S640). The voice trigger operation may be performed based on the compensated audio input data CSDI to which the echo cancellation is applied, and thus a recognition rate of the voice trigger operation may be enhanced.

In some embodiments, the trigger interface TIF may be disabled while the audio replay is performed. In other words, the trigger interface TIF may not receive the trigger input signal SMIC, and the voice trigger system VTS may perform the voice trigger operation based on the compensated audio input data CSDI instead of the trigger input signal SMIC. In some embodiments, a first voice trigger operation may be performed outside of the barge-in condition based on the trigger input signal SMIC and a second voice trigger operation may be performed during the barge-in condition based on the compensated audio input data CSDI.

Figure 11:
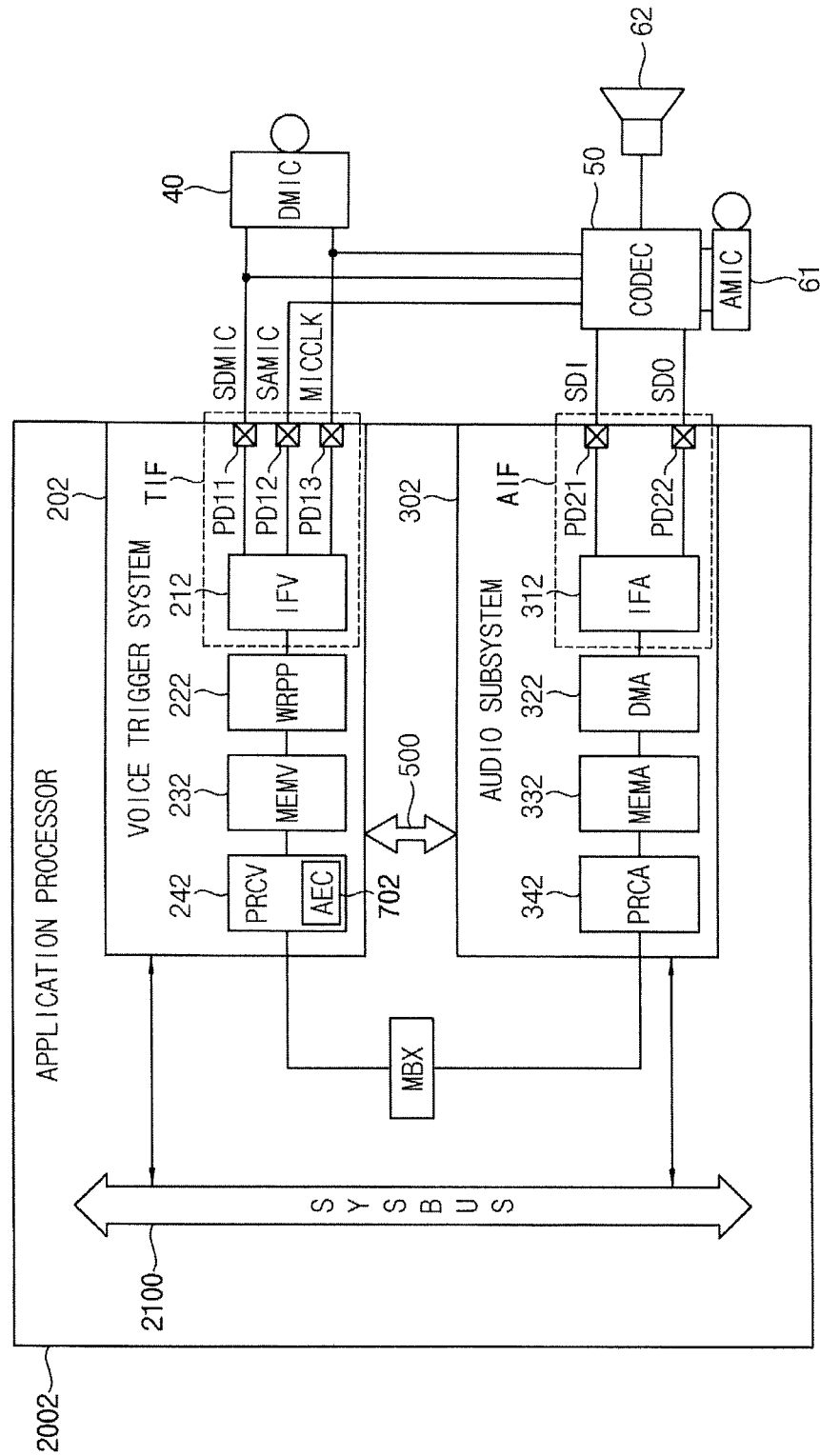
FIG. 11 is a block diagram illustrating a connection of a voice trigger system and an audio subsystem in an application processor according to some embodiments.

FIG. 11 is a block diagram illustrating a connection of a voice trigger system and an audio subsystem in an application processor according to some embodiments. The host processor 100 and other elements of FIG. 3 may be omitted in FIG. 11 for convenience of illustration and the descriptions repeated with FIGS. 3 and 5 may be omitted.

Referring to FIG. 11, an application processor 2002 may include a system bus SYSBUS 2100, a voice trigger system 202, an audio subsystem 302, a direct bus 500, and a mail box module MBX. The audio subsystem 302 may be included in the audio processing system 250 of FIG. 2A.

The voice trigger system 202 may include a trigger interface circuit 212, a wrapper 222, a trigger memory 232, and a trigger processor 242.

The audio subsystem 302 may include an audio interface circuit 312, a direct memory access controller 322, an audio memory 332, and an audio processor 342.

In comparison with the echo canceller 701 included in the audio subsystem 301 of the application processor 2001 of FIG. 5, an echo canceller 702 may be included in the trigger processor 242 in the voice trigger system 202 of the application processor 2002 of FIG. 11. The echo canceller 702 may be the echo canceller 95 described with reference to FIG. 4. In some embodiments, an echo cancellation may be performed by the echo canceller 702 in the voice trigger system 202.

Figure 12:
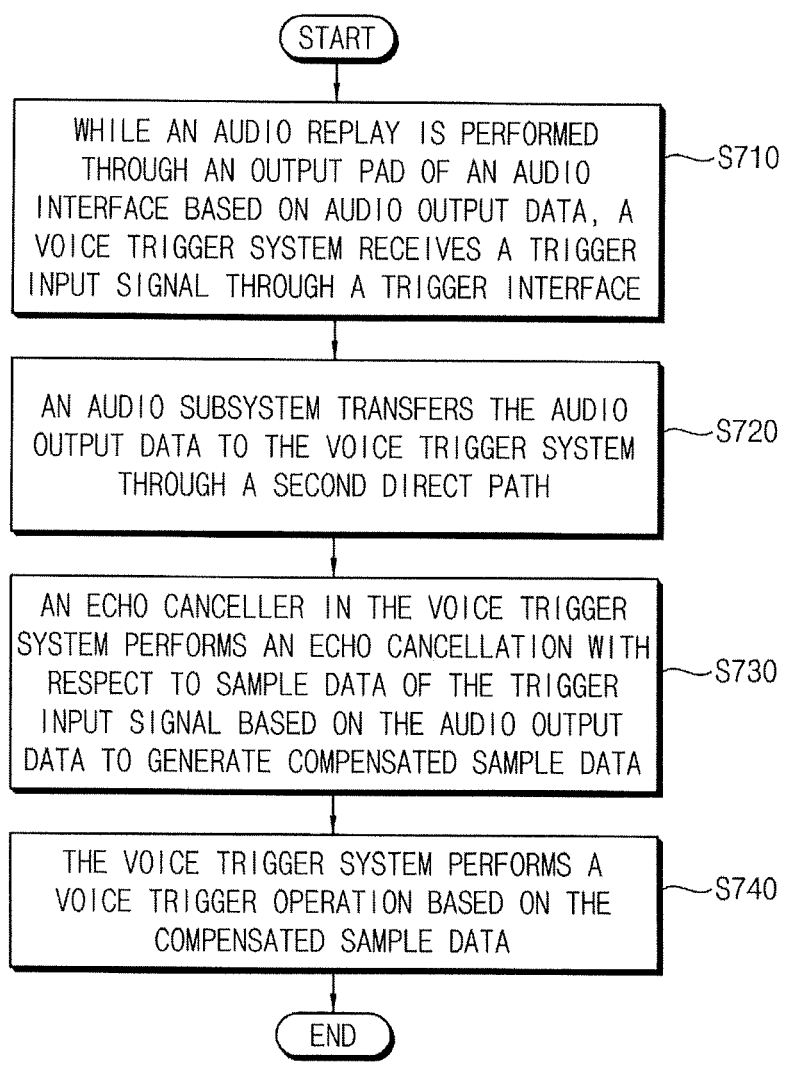
FIG. 12 is a flow chart illustrating operations of methods of operating an application processor according to some embodiments.
Figure 13:
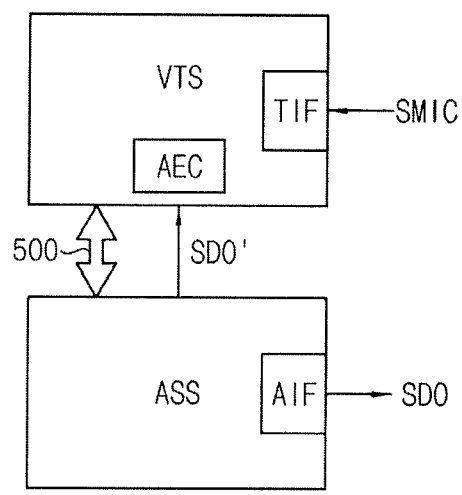
FIG. 13 is a block diagram illustrating a voice trigger system and an audio subsystem performing operations of the methods of operating the application processor of FIG. 12 according to some embodiments.

FIG. 12 is a flow chart illustrating operations of methods of operating an application processor according to some embodiments. FIG. 13 is a block diagram illustrating a voice trigger system and an audio subsystem performing operations of the methods of operating the application processor of FIG. 12 according to some embodiments.

Referring to FIGS. 12 and 13, while an audio replay is performed by an audio subsystem ASS through an output pad of an audio interface AIF based on audio output data SDO' corresponding to an audio output signal SDO, a voice trigger system VTS may receive a trigger input signal SMIC through a trigger interface TIF (S710).

The audio subsystem ASS may transfer the audio output data SDO' to the voice trigger system VTS (S720). For example, the audio output data SDO' may be transferred through a second direct path (e.g., the second direct path ② in FIG. 6A) in the direct bus 500 without passing through the system bus 2100. Accordingly, during a barge-in condition, the host processor 100 and the system bus 2100 may maintain a sleep mode and the transfer of the audio output data SDO' may not wake up the host processor 100 and the system bus 2100 into an active mode.

An echo canceller AEC in the voice trigger system VTS may perform an echo cancellation with respect to sample data of the trigger input signal SMIC based on the audio output data SDO' to generate compensated sample data (S730). The audio output data SDO' may be used as a reference signal, and the sample data may be used as a received signal for the echo cancellation.

The voice trigger system VTS may perform a voice trigger operation based on the compensated sample data (S740). The voice trigger operation may be performed based on the compensated sample data to which the echo cancellation is applied, and thus a recognition rate of the voice trigger operation may be enhanced.

In some example embodiments, while the data DSM, CDSM, CSDI, and/or SDO' may be transferred through the direct bus 500 in examples of FIGS. 8, 10, and 13, the mail box module MBX may be used for the synchronization of the data communication.

Figure 14:
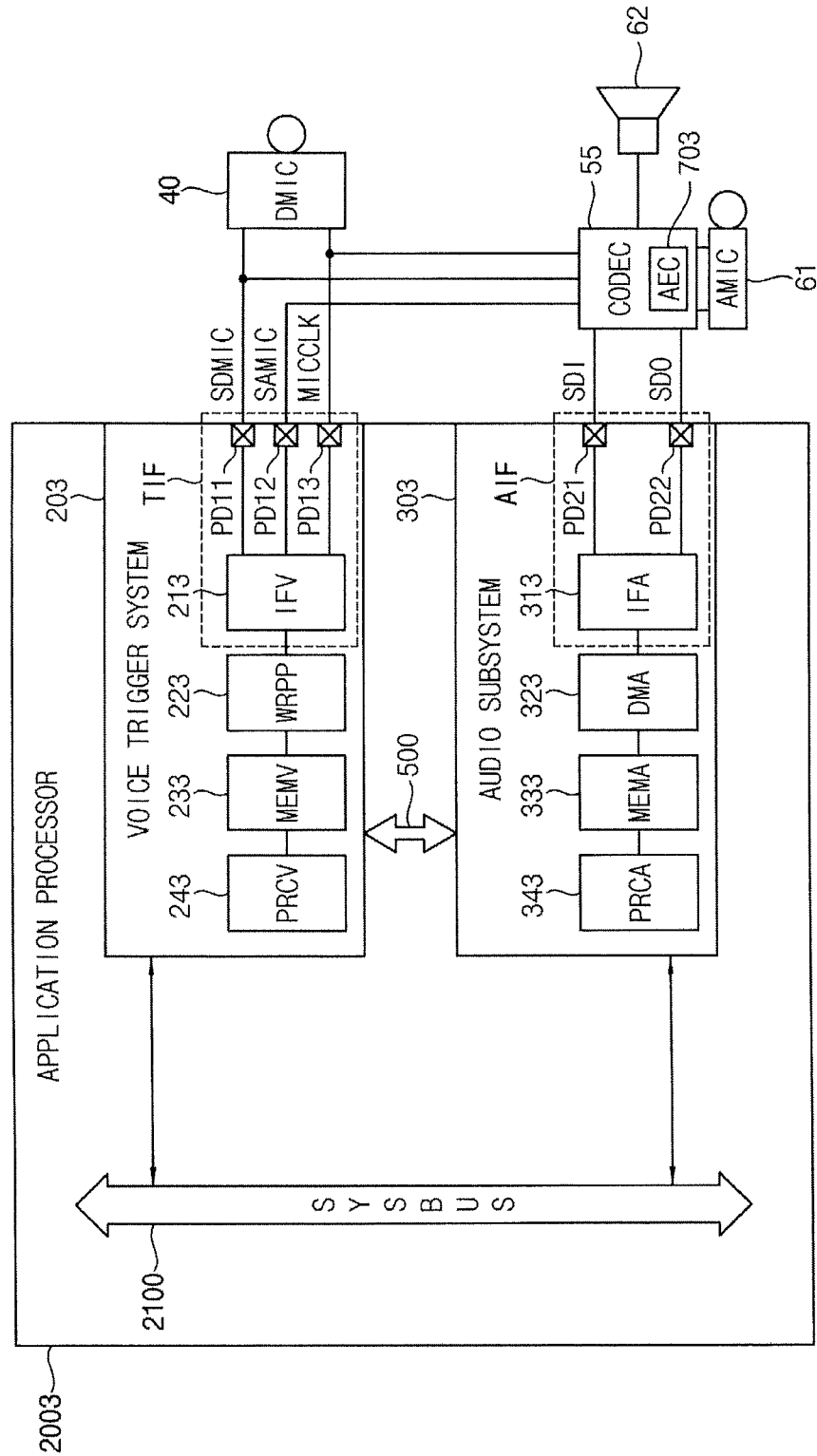
FIG. 14 is a block diagram illustrating a connection of a voice trigger system and an audio subsystem in an application processor according to some embodiments.

FIG. 14 is a block diagram illustrating a connection of a voice trigger system and an audio subsystem in an application processor according to some embodiments. The host processor 100 and other elements of FIG. 3 may be omitted in FIG. 14 for convenience of illustration and the descriptions repeated with FIGS. 3 and 5 may be omitted.

Referring to FIG. 14, an application processor 2003 may include a system bus SYSBUS 2100, a voice trigger system 203, an audio subsystem 303, a direct bus 500, and a mail box module MBX. The audio subsystem 303 may be included in the audio processing system 250 of FIG. 2A.

The voice trigger system 203 may include a trigger interface circuit 213, a wrapper 223, a trigger memory 233, and a trigger processor 243.

The audio subsystem 303 may include an audio interface circuit 313, a direct memory access controller 323, an audio memory 333, and an audio processor 343.

In comparison with the echo canceller 701 included in the audio subsystem 301 of the application processor 2001 of FIG. 5 and the echo canceller 702 included in the voice trigger system 202 of the application processor 2002 of FIG. 11, an echo canceller 703 may be included in an audio codec 55 connected to the trigger interface TIF of the application processor 2003 of FIG. 14. The echo canceller 703 may be the echo canceller 95 described with reference to FIG. 4. In some embodiments, an echo cancellation may be performed by the echo canceller 703 in the audio codec 55.

Figure 15:
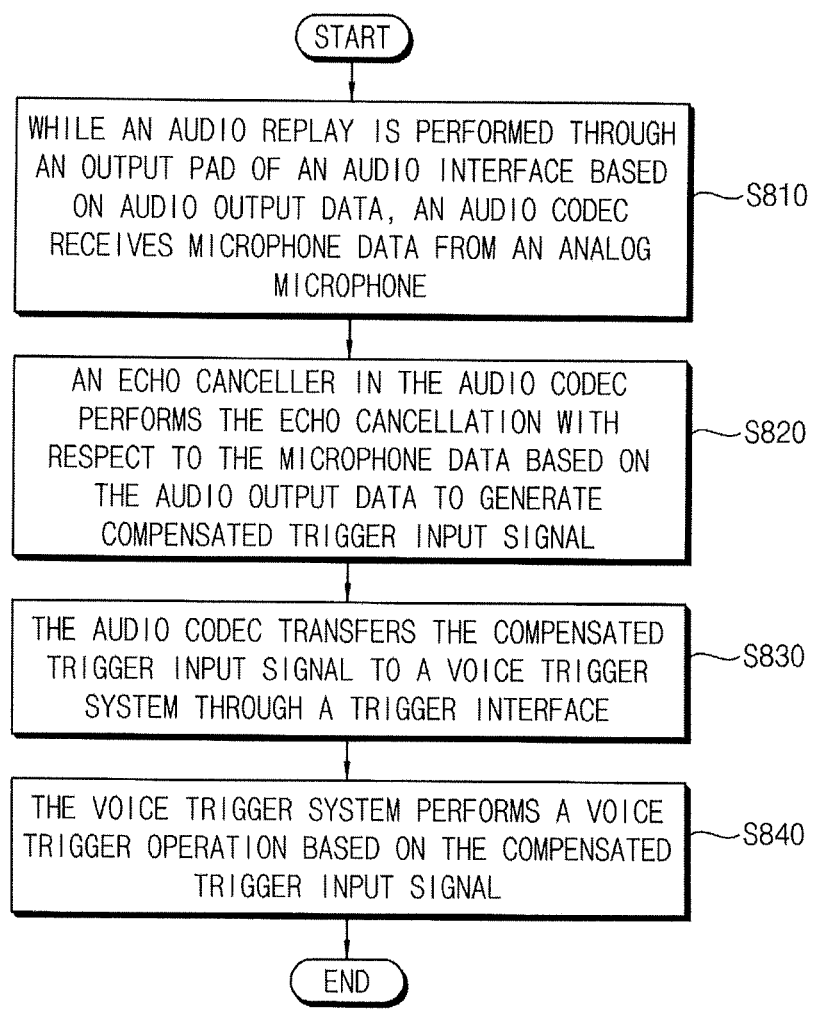
FIG. 15 is a flow chart illustrating operations of methods of operating an application processor according to some embodiments.
Figure 16:
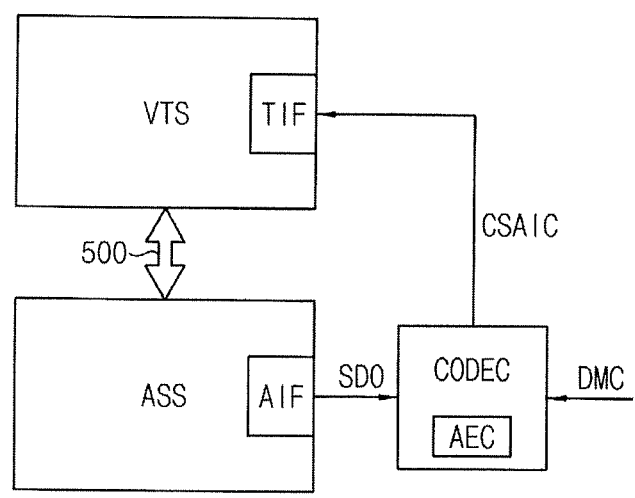
FIG. 16 is a block diagram illustrating a voice trigger system and an audio subsystem performing operations of the methods of operating the application processor of FIG. 15 according to some embodiments.

FIG. 15 is a flow chart illustrating operations of methods of operating an application processor according to some embodiments. FIG. 16 is a block diagram illustrating a voice trigger system and an audio subsystem performing operations of the methods of operating the application processor of FIG. 15 according to some embodiments.

Referring to FIGS. 15 and 16, while an audio replay is performed by an audio subsystem ASS through an output pad of an audio interface AIF based on audio output data corresponding to an audio output signal SDO, an audio codec CODEC may receive microphone data DMC from an analog microphone (S810).

An echo canceller AEC in the audio codec CODEC may perform an echo cancellation with respect to the microphone data DMC based on the audio output data to generate compensated trigger input signal CSAIC (S820). The audio output data may be used as a reference signal, and the microphone data DMC may be used as a received signal for the echo cancellation.

The audio codec CODEC may transfer the compensated trigger input signal CSAIC to a voice trigger system VTS through a trigger interface TIF (S830).

The voice trigger system VTS may perform a voice trigger operation based on the compensated trigger input signal CSAIC (S840). The voice trigger operation may be performed based on the compensated trigger input signal CSAIC to which the echo cancellation is applied, and thus a recognition rate of the voice trigger operation may be enhanced.

In some embodiments, the compensated trigger input signal CSAIC may be directly transferred to the voice trigger system VTS through the trigger interface TIE Accordingly, during a barge-in condition, the host processor 100 and the system bus 2100 may maintain a sleep mode and the transfer of the compensated trigger input signal CSAIC may not wake up the host processor 100 and the system bus 2100 into the active mode for the voice trigger operation.

In some embodiments, the audio codec 50 or the audio codec 55 may be included in the voice trigger system or may be between the voice trigger system and the audio subsystem, or the audio subsystem may be further connected to the Bluetooth module 70 connected to the Bluetooth microphone BMIC 81 and the Bluetooth speaker 82 or the USB module connected to a USB microphone and a USB speaker, or the audio codec 50 may be replaced with the Bluetooth module 70 and/or the USB module.

Figure 17:
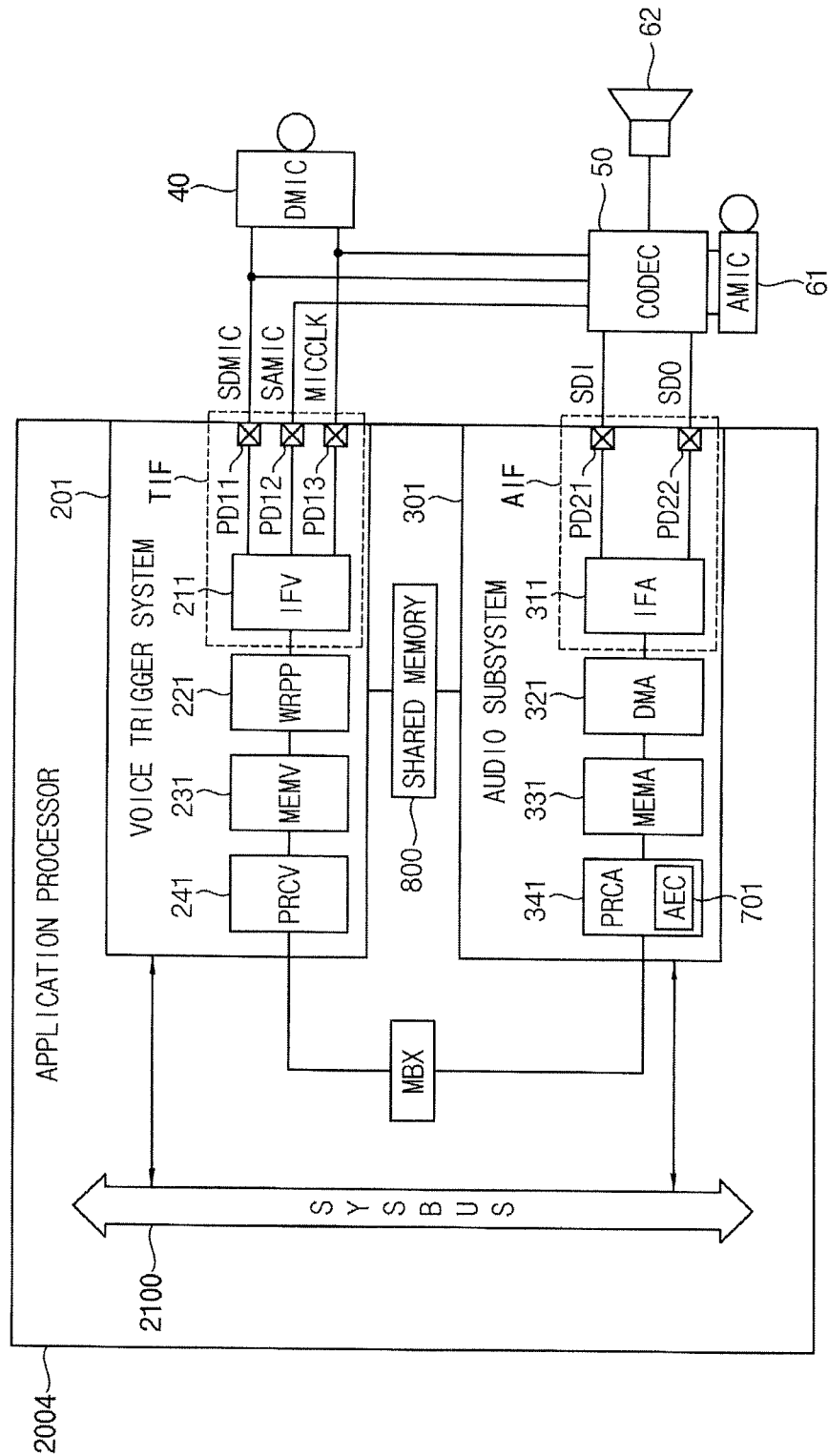
FIG. 17 is a block diagram illustrating a connection of a voice trigger system and an audio subsystem in an application processor according to some embodiments.

FIG. 17 is a block diagram illustrating a connection of a voice trigger system and an audio subsystem in an application processor according to some embodiments. The host processor 100 and other elements of FIG. 3 may be omitted in FIG. 17 for convenience of illustration and the descriptions repeated with FIGS. 3 and 5 may be omitted.

Referring to FIG. 17, an application processor 2004 may include a system bus SYSBUS 2100, a voice trigger system 201, an audio subsystem 301, a shared memory 800, and a mail box module MBX. The audio subsystem 301 may be included in the audio processing system 250 of FIG. 2A.

In comparison with the application processor 2001 of FIG. 5 including the direct bus 500 between the voice trigger system 201 and the audio subsystem 301, the direct bus may be replaced with the shared memory 800 in the application processor 2004. The shared memory 800 may be between the voice trigger system 201 and the audio subsystem 301 and may store data transferred between the voice trigger system 201 and the audio subsystem 301 during the barge-in condition. While an audio replay is performed through the audio interface AIF during the barge-in condition, the application processor 2004 may perform an echo cancellation with respect to the microphone data received from a microphone to generate the compensated data using the shared memory 800, and the voice trigger system 201 may perform a voice trigger operation based on the compensated data.

In some embodiments, the direct bus 500 in the application processors 2002 and 2003 of FIGS. 11 and 14 may also be replaced with the shared memory 800.

Figure 18A:
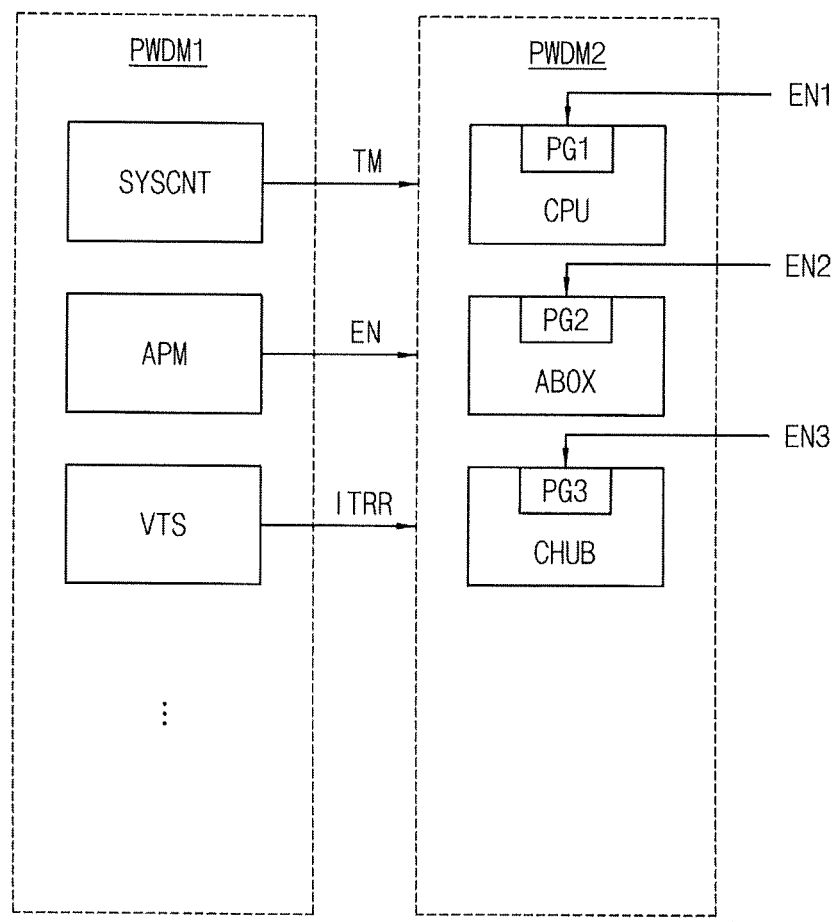
FIGS. 18A and 18B are block diagrams illustrating power domains of an application processor according to some embodiments.
Figure 18B:
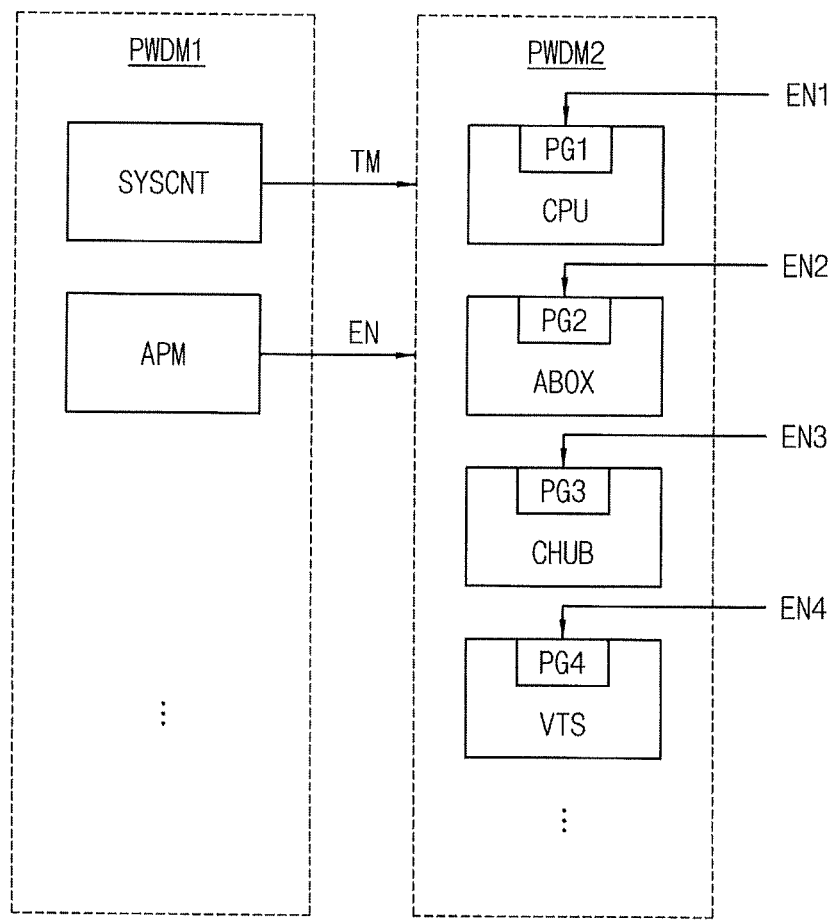

FIGS. 18A and 18B are block diagrams illustrating power domains of an application processor according to some embodiments.

An application processor may include a plurality of power domains that are independently powered. FIGS. 18A and 18B illustrate a first power domain PWDM1 and a second power domain PWDM2 as an example. The first power domain PWDM1 may correspond to an always-powered domain where power is supplied in both of an active mode and a standby mode (or a sleep mode), and the second power domain PWDM2 may correspond to a power-save domain where power is blocked in the standby mode.

Referring to FIG. 18A, a system counter SYSCNT, an active power manager APM, and a voice trigger system VTS may be in the always-powered domain PWDM1. A plurality of hardware blocks such as a host processor CPU, an audio subsystem ABOX, a sensor hub CHUB, etc. may be in the power-save domain PWDM2.

The system counter SYSCNT may generate time information TM and provide the time information TM to internal circuits of the system. The active power manager APM may generate a plurality of power enable signals EN to control power supply, power block, etc. of various elements in the system. The voice trigger system VTS may generate an interrupt signal ITRR representing the trigger event.

As used herein, the active mode represents that at least the host processor CPU is enabled and an operating system (OS) runs. The sleep mode or the standby mode represents a power-down mode wherein the host processor CPU is disabled.

In comparison with the disposition of FIG. 18A, the voice trigger system VTS may be disposed in the power-save domain PWDM2, as illustrated in FIG. 18B.

As illustrated in FIGS. 18A and 18B, the host processor CPU, the voice trigger system VTS, the audio subsystem ABOX, and the sensor hub CHUB may include power gating circuits PG1, PG2, PG3 and PG4, respectively. The power gating circuits PG1-PG4 may supply power selectively in response to power enable signals EN1, EN2, EN3 and EN4. As such, the voice trigger system VTS, the audio subsystem ABOX and the sensor hub CHUB may be power-gated and enabled independently of the host processor CPU. In some example embodiments, the voice trigger system VTS may request the active power manager APM so that the sensor hub CHUB may be enabled when it is required.

The inventive concept may be applied to various integrated circuits, electronic devices and electronic systems supporting the voice trigger function. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of some embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other embodiments, are intended to be included within the scope of the claims.

What is claimed is:

1. An application processor comprising:
a system bus;
a host processor electrically connected to the system bus;

a voice trigger system electrically connected to the system bus, the voice trigger system configured to perform a voice trigger operation and to issue a trigger event;

an audio subsystem electrically connected to the system bus, the audio subsystem configured to replay an audio output stream through an audio interface; and a direct bus electrically connecting the voice trigger system to the audio subsystem, the direct bus configured to provide a communication path between the voice trigger system and the audio subsystem during a barge-in condition in which the voice trigger operation and the replay of the audio output stream are performed together, wherein, while the replay of the audio output stream is performed through the audio interface during the barge-in condition, the application processor is configured to generate compensated trigger data by performing an echo cancellation with respect to microphone data received from a microphone, and the voice trigger system is configured to perform the voice trigger operation based on the compensated trigger data, wherein the voice trigger system is configured to transfer sample data of a trigger interface audio input signal to the audio subsystem, wherein the audio subsystem is further configured to:
perform the echo cancellation with respect to the sample data based on the audio output stream to generate compensated sample data, and
transfer the compensated sample data to the voice trigger system, wherein the voice trigger system is configured to perform the voice trigger operation based on the compensated sample data, and wherein the compensated sample data is the compensated trigger data.

2. The application processor of claim 1, wherein the application processor is configured to perform a first data transmission from the voice trigger system to the audio subsystem and a second data transmission from the audio subsystem to the voice trigger system.

3. The application processor of claim 2, wherein the audio subsystem comprises an echo canceller configured to perform the echo cancellation.

4. The application processor of claim 3,
wherein the voice trigger system comprises a trigger interface configured to receive the trigger interface audio input signal while the replay of the audio output stream is performed.

5. The application processor of claim 4,
wherein the voice trigger system is configured to transfer the sample data of the trigger interface audio input signal to the audio subsystem through the first data transmission,
wherein the echo canceller in the audio subsystem is configured to perform the echo cancellation with respect to the sample data based on the audio output stream to generate the compensated sample data, and
wherein the audio subsystem is configured to transfer the compensated sample data to the voice trigger system through the second data transmission.

6. The application processor of claim 3, wherein the audio subsystem is configured to receive an audio input signal through an input pad of the audio interface while the replay of the audio output stream is performed.

7. The application processor of claim 6,
wherein the echo canceller in the audio subsystem is configured to perform the echo cancellation with respect to audio input data of the audio input signal based on the audio output stream to generate compensated audio input data,
wherein the audio subsystem is configured to transfer the compensated audio input data to the voice trigger system through the second data transmission, and
wherein the voice trigger system is configured to perform the voice trigger operation based on the compensated audio input data.

8. The application processor of claim 6,
wherein the voice trigger system comprises a trigger interface configured to receive a trigger interface audio input signal, and
wherein the application processor is configured to disable the trigger interface while the replay of the audio output stream is performed.

9. The application processor of claim 2, wherein the voice trigger system comprises an echo canceller configured to perform the echo cancellation.

10. The application processor of claim 9, wherein the voice trigger system comprises a trigger interface that is configured to receive a trigger interface audio input signal while the replay of the audio output stream is performed.

11. The application processor of claim 10,
wherein the audio subsystem is configured to transfer audio output data corresponding to the audio output stream to the voice trigger system through the second data transmission,
wherein the echo canceller in the voice trigger system is configured to perform the echo cancellation with respect to sample data of the trigger interface audio input signal based on the audio output data to generate compensated sample data, and
wherein the voice trigger system is configured to perform the voice trigger operation based on the compensated sample data.

12. The application processor of claim 2,
the voice trigger system comprises a trigger interface, and
wherein an audio codec connected to the trigger interface comprises an echo canceller configured to perform the echo cancellation.

13. The application processor of claim 12, wherein the audio codec is configured to receive the microphone data from an analog microphone while the replay of the audio output stream is performed.

14. The application processor of claim 13,
wherein the echo canceller in the audio codec is configured to perform the echo cancellation with respect to the microphone data based on the audio output stream to generate a compensated trigger input signal,
wherein the audio codec is configured to transfer the compensated trigger input signal to the voice trigger system through the trigger interface, and
wherein the voice trigger system is configured to perform the voice trigger operation based on the compensated trigger input signal.

15. The application processor of claim 1, wherein:
the direct bus comprises a shared memory between the voice trigger system and the audio subsystem,
data transferred between the voice trigger system and the audio subsystem during the barge-in condition is stored in the shared memory, and
while the replay of the audio output stream is performed through the audio interface during the barge-in condition, the application processor is configured to perform the echo cancellation with respect to the microphone data received from the microphone to generate the compensated trigger data using the shared memory, and the voice trigger system is configured to perform the voice trigger operation based on the compensated trigger data.

16. The application processor of claim 1, wherein the system bus, the host processor, the voice trigger system, the audio subsystem, and the direct bus are integrated in a single semiconductor chip.

17. The application processor of claim 1, wherein the application processor is configured to maintain the host processor and the system bus in a sleep mode without waking up the host processor and the system bus into an active mode for the voice trigger operation while the replay of the audio output stream is performed through the audio interface.

18. The application processor of claim 17, wherein each of the voice trigger system and the audio subsystem is power-gated and enabled independently of the host processor.

19. An electronic device comprising:
an application processor; and
at least one audio input-output device, the application processor comprising:
  a system bus;
  a host processor electrically connected to the system bus;
  a voice trigger system electrically connected to the system bus, the voice trigger system configured to perform a voice trigger operation and to issue a trigger event;
  an audio subsystem electrically connected to the system bus, the audio subsystem configured to replay an audio output stream through the at least one audio input-output device; and
  a direct bus electrically connecting the voice trigger system to the audio subsystem, the direct bus configured to provide a communication path between the voice trigger system and the audio subsystem during a barge-in condition in which the voice trigger operation and the replay of the audio output stream are performed together,
wherein, while the replay of the audio output stream is performed through the at least one audio input-output device during the barge-in condition, the application processor is configured to generate compensated trigger data by performing an echo cancellation with respect to microphone data received from a microphone, and the voice trigger system is configured to perform the voice trigger operation based on the compensated trigger data,
wherein the voice trigger system is configured to transfer sample data of a trigger interface audio input signal to the audio subsystem,
wherein the audio subsystem is further configured to:
  perform the echo cancellation with respect to the sample data based on the audio output stream to generate compensated sample data, and
  transfer the compensated sample data to the voice trigger system,
wherein the voice trigger system is configured to perform the voice trigger operation based on the compensated sample data, and
wherein the compensated sample data is the compensated trigger data.

20. A method of operating an application processor, the method comprising:
performing, by a voice trigger system, a voice trigger operation to issue a trigger event, the voice trigger system being integrated with a host processor and an audio subsystem in a single semiconductor chip, the application processor comprising a direct bus electrically connecting the voice trigger system and the audio subsystem and the application processor comprising a system bus electrically connecting the host processor, the voice trigger system, and the audio subsystem;
replaying, by the audio subsystem, an audio output stream through an audio interface;
during a barge-in condition in which the voice trigger operation and the replaying of the audio output stream are performed together, generating compensated trigger data by performing an echo cancellation with respect to microphone data received from a microphone, the direct bus being configured to provide a communication path between the voice trigger system and the audio subsystem during the barge-in condition; and
performing, by the voice trigger system, the voice trigger operation based on the compensated trigger data,
wherein the voice trigger system transfers sample data of a trigger interface audio input signal to the audio subsystem,
wherein the audio subsystem:
  performs the echo cancellation with respect to the sample data based on the audio output stream to generate compensated sample data, and
  transfers the compensated sample data to the voice trigger system,
wherein the voice trigger system performs the voice trigger operation based on the compensated sample data, and
wherein the compensated sample data is the compensated trigger data.

* * * * *